US 9,991,957 B2

(12) United States Patent
Thangavelautham et al.

(10) Patent No.: US 9,991,957 B2
(45) Date of Patent: Jun. 5, 2018

(54) LOW-COST, LONG-DISTANCE, HIGH-BANDWIDTH LASER COMMUNICATION SYSTEM FOR SMALL MOBILE DEVICES AND SPACECRAFT

(71) Applicant: Arizona Board of Regents on behalf of Arizona State University, Scottsdale, AZ (US)

(72) Inventors: Jekanthan Thangavelautham, Tempe, AZ (US); Xinchen Guo, Mesa, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 0 days. days.

(21) Appl. No.: 15/353,653

(22) Filed: Nov. 16, 2016

(65) Prior Publication Data
US 2017/0141849 A1 May 18, 2017

Related U.S. Application Data

(60) Provisional application No. 62/255,995, filed on Nov. 16, 2015.

(51) Int. Cl.
*H04B 10/118* (2013.01)
*H04B 10/29* (2013.01)
(Continued)

(52) U.S. Cl.
CPC ....... *H04B 10/118* (2013.01); *H04B 7/18506* (2013.01); *H04B 7/19* (2013.01);
(Continued)

(58) Field of Classification Search
CPC combination set(s) only.
See application file for complete search history.

(56) References Cited

U.S. PATENT DOCUMENTS 3,943,357 A 3/1976 Culver
4,361,911 A 11/1982 Buser et al.
(Continued)

FOREIGN PATENT DOCUMENTS

WO 2008007044 A1 1/2008

OTHER PUBLICATIONS

Cecchini, I.D'Antone et al., "Solar Panels as Air Cherenkov Detectors for Extremely High Energy Cosmic Rays," arXivhep-ex/0002023v1 Feb. 7, 2000, pp. 1-6.
(Continued)

*Primary Examiner* — David Payne
*Assistant Examiner* — Omar S Ismail
(74) *Attorney, Agent, or Firm* — Schwabe, Williamson & Wyatt, P.C.

(57) ABSTRACT

In accordance with embodiments disclosed herein, there are provided methods and systems for low-cost, long-distance, high-bandwidth laser communication system for small mobile devices and spacecraft. For example, in one embodiment, such a system includes a first station having therein: (i) a processor and a memory to implement configuration instructions for the system, (ii) a laser origination source, and (iii) a transmitter to transmit a laser signal from the laser origination source from the first station; a second station having therein: (i) a processor and a memory to implement configuration instructions for the system, (ii) a light sensor array to receive the laser signal transmitted from the first station, and (iii) a reflector to reflect back at least a portion of the transmitted laser signal back to the first station; and in which the second station is to modulate the received laser signal transmitted from the first station to encode a message onto the laser signal reflected back to the first station. Other related embodiments are disclosed.

16 Claims, 13 Drawing Sheets

(51) Int. Cl.
H04B 7/195 (2006.01)
H04B 7/19 (2006.01)
H04B 7/185 (2006.01)
H04B 10/50 (2013.01)

(52) U.S. Cl.
CPC .............. *H04B 7/195* (2013.01); *H04B 10/29* (2013.01); *H04B 10/503* (2013.01)

(56) References Cited

U.S. PATENT DOCUMENTS

| | | | |
|---|---|---|---|
| 4,889,409 | A | 12/1989 | Atcheson |
| 6,154,299 | A | 11/2000 | Gilbreath et al. |
| 6,954,302 | B2 | 10/2005 | Sayyah et al. |
| 7,339,726 | B2 | 3/2008 | Fathimulla et al. |
| 7,345,804 | B1 | 3/2008 | Sayyah et al. |
| 2003/0185164 | A1* | 10/2003 | Marko ............... H04B 7/18534 370/316 |
| 2007/0189779 | A1 | 8/2007 | Murphy et al. |
| 2007/0273948 | A1 | 11/2007 | Roes et al. |
| 2007/0297805 | A1 | 12/2007 | Rabinovich et al. |
| 2009/0073536 | A1 | 3/2009 | Goetz et al. |
| 2010/0303466 | A1 | 12/2010 | Chand et al. |
| 2014/0079404 | A1 | 3/2014 | Kykta |
| 2016/0043800 | A1* | 2/2016 | Kingsbury ........... H04B 10/118 398/125 |
| 2016/0204865 | A1* | 7/2016 | Boroson ............ H04B 10/1121 398/97 |
| 2017/0041074 | A1* | 2/2017 | Wang .................. H04B 10/118 |

OTHER PUBLICATIONS

Cochenour, Brandon et al., "Underwater Optical With a Modulating Retro Reflector," Ocean Sensing and Monitoring, edited by Weilin (Will) Hou, Proc. of SPIE vol. 7317, 73170G, pp. 1-10.

Creamer, N. Glenn et al., "Interspacecraft Optical Communication and Navigation Using Modulating Retroreflectors," Journal of Guidance, Control, and Dynamics, vol. 27, No. 1, Jan.-Feb. 2004, pp. 1-7.

Gilbreath, G. Charmaine, et al., "Modulating Retroreflector Architecture Using Multiple Quantum Wells for Free-space Optical Communications," SPIEDigitalLibrary.org/conference-proceedings-of-spie, pp. 1-7.

Gilbreath, G.C. et al., Large-aperture Multiple Quantum Well Modulating Retroreflector for Free-space Optical Data Transfer on Unmanned Aerial Vehicles, 2001 Society of Photo-Optical Instrumentation Engineers, Opt. Eng. 40(7) 1348-1356 (Jul. 2001), pp. 1-9.

Goetz, Peter G. et al., "Modulating Retroreflector Implementation of MIL-STD-1553 Protocol with Free-Space Optics," Proceedings of the 2003 IEEE Aerospace Conference, Paper No. 1559, NRL Release No. 03-1226-0334, pp. 1-10.

Goetz, Peter G. et al., "Modulating Retro-reflector Lasercom Systems at the Naval Research Laboratory," The 2010 Military Communications Conference—Unclassified Program—Systems Perspectives Track, pp. 1-7.

Junique, Stéphane et al., "A Modulating Retro-Reflector for Free-Space Optical Communication," IEEE Photonics Technology Letters, vol. 18, No. 1, Jan. 1, 2006, pp. 1-3.

Majumdar, Arun K., "Free-space Laser Communication Performance in the Atmospheric Channel," 2005 Springer Science + Business Media Inc., pp. 1-52.

Majumdar, Arun K., Modulating Retroreflector-based Free-space Optical (FSO) Communications, Chapter 8, pp. 1-26.

Mullen, Linda et al., "Backscatter Suppression for Underwater Modulating Retroreflector Links Using Polarization Discrimination," Applied Optics / vol. 48, No. 2 / Jan. 10, 2009, pp. 1-10.

NASA, National Aeronautics and Space Administration, Press Kit, Oct. 2009, pp. 1-114.

Öhgren, Johan et al., "A High-speed Modulated Retro-reflector Communication Link With a Transmissive Modulator in a Cat's Eye Optics Arrangement," Unmanned/Unattended Sensors and Sensor Networks IV, Proc. of SPIE vol. 6736, 673619, (2007), pp. 1-12.

Rabinovich, W.S., et al., "Intrinsic Multiple Quantum Well Spatial Light Modulators," American Institute of Physics, Appl. Phys. Lett. 66 (9), Feb. 27, 1995, pp. 1-4.

Rabinovich, W.S., et al., "Cat's Eye Quantum Well Modulating Retro-reflectors for Freespace Optical Communications," Free-Space Laser Communication Technologies XV, Proceedings of SPIE vol. 4975 (2003), pp. 1-11.

Swenson, Charles M., et al., "Low Power FLC-based Retromodulator Communications System," SPIEDigitalLibrary.org/conference-proceedings-of-spie, Proc, SPIE 2990, Free-Space Laser Communication Technologies IX, (Feb. 14, 1997), pp. 1-16.

Tholl, Hans Dieter, "Novel Laser Beam Steering Techniques," Proc, SPIE 6397, Technologies for Optical Countermeasures III, vol. 6397, 639708 (Oct. 5, 2006), pp. 1-15.

Zhou, Lixia et al., "Corner-Cube Retroreflectors Based on Structure-Assisted Assembly for Free-Space Optical Communication," Journal of Microelectromechanical Systems, vol. 12, No. 3, Jun. 2003, pp. 1-10.

\* cited by examiner

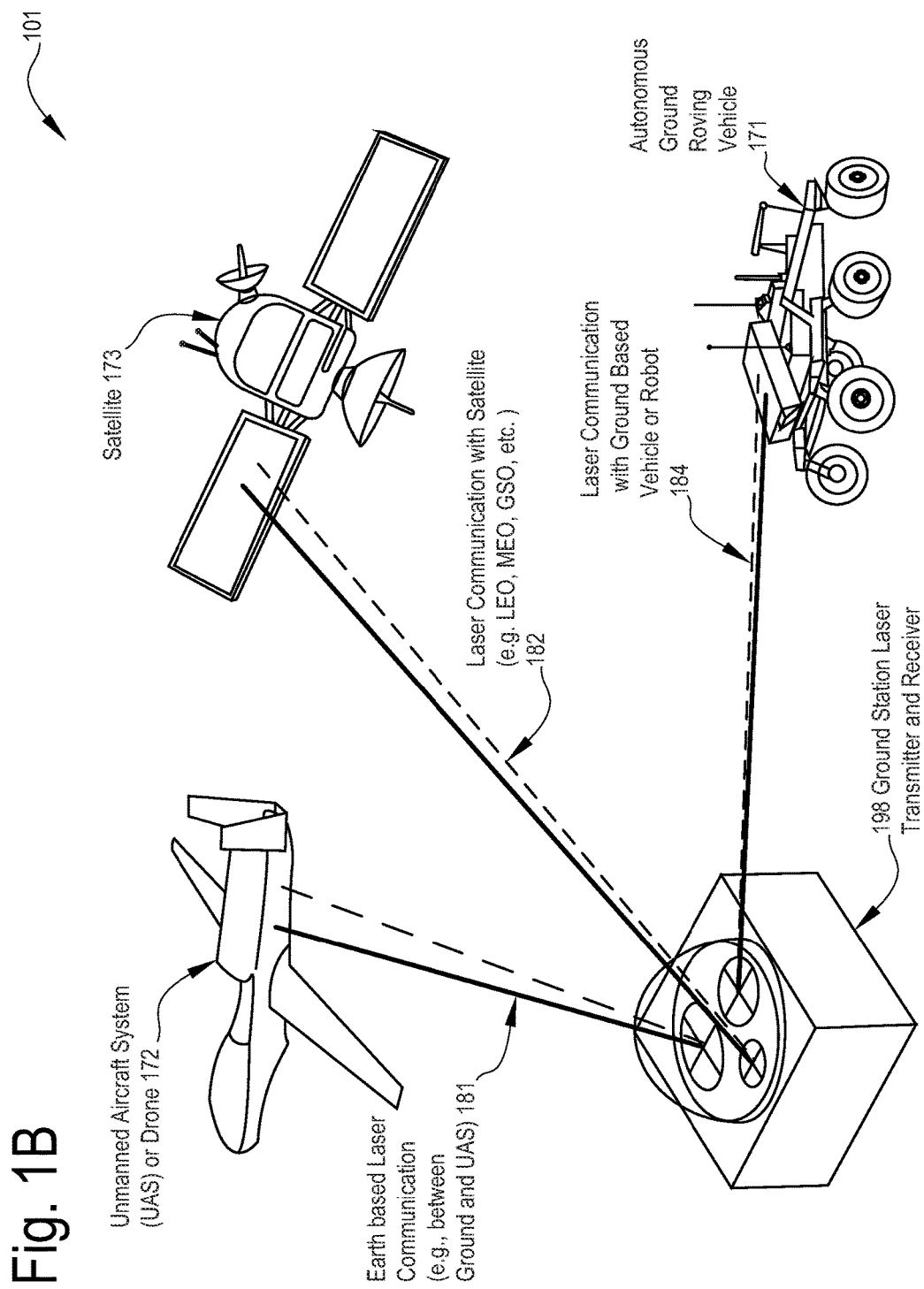

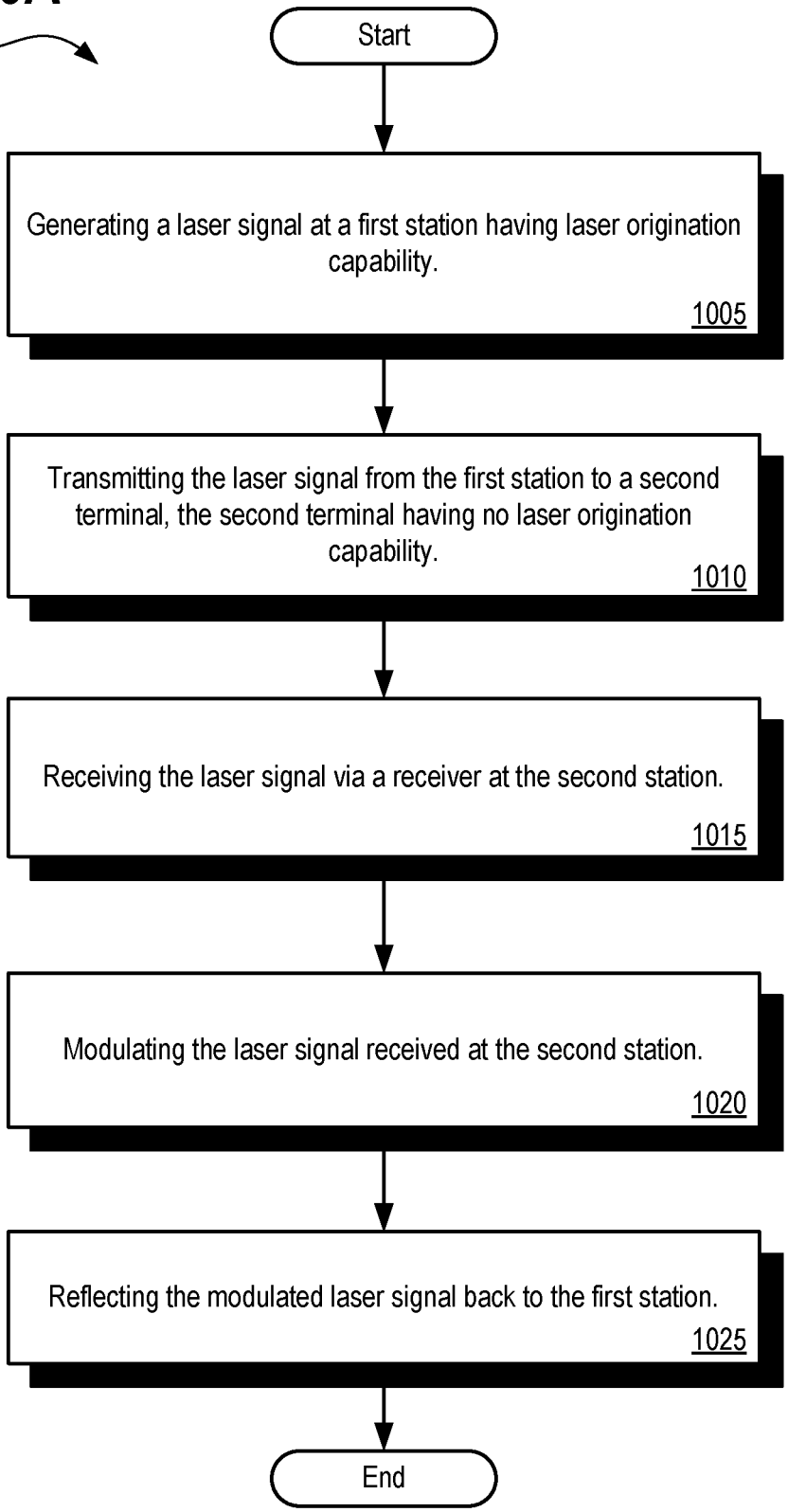

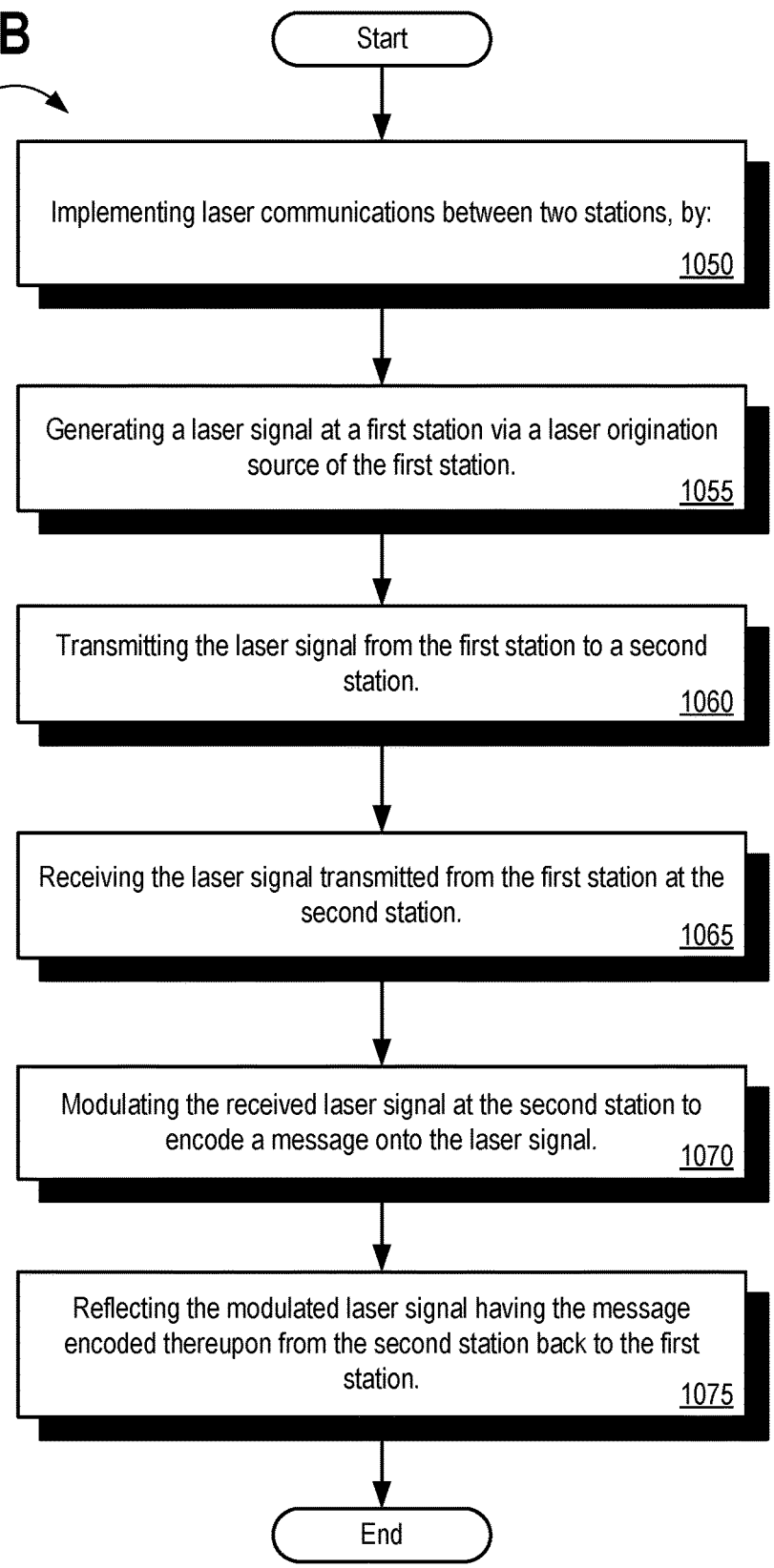

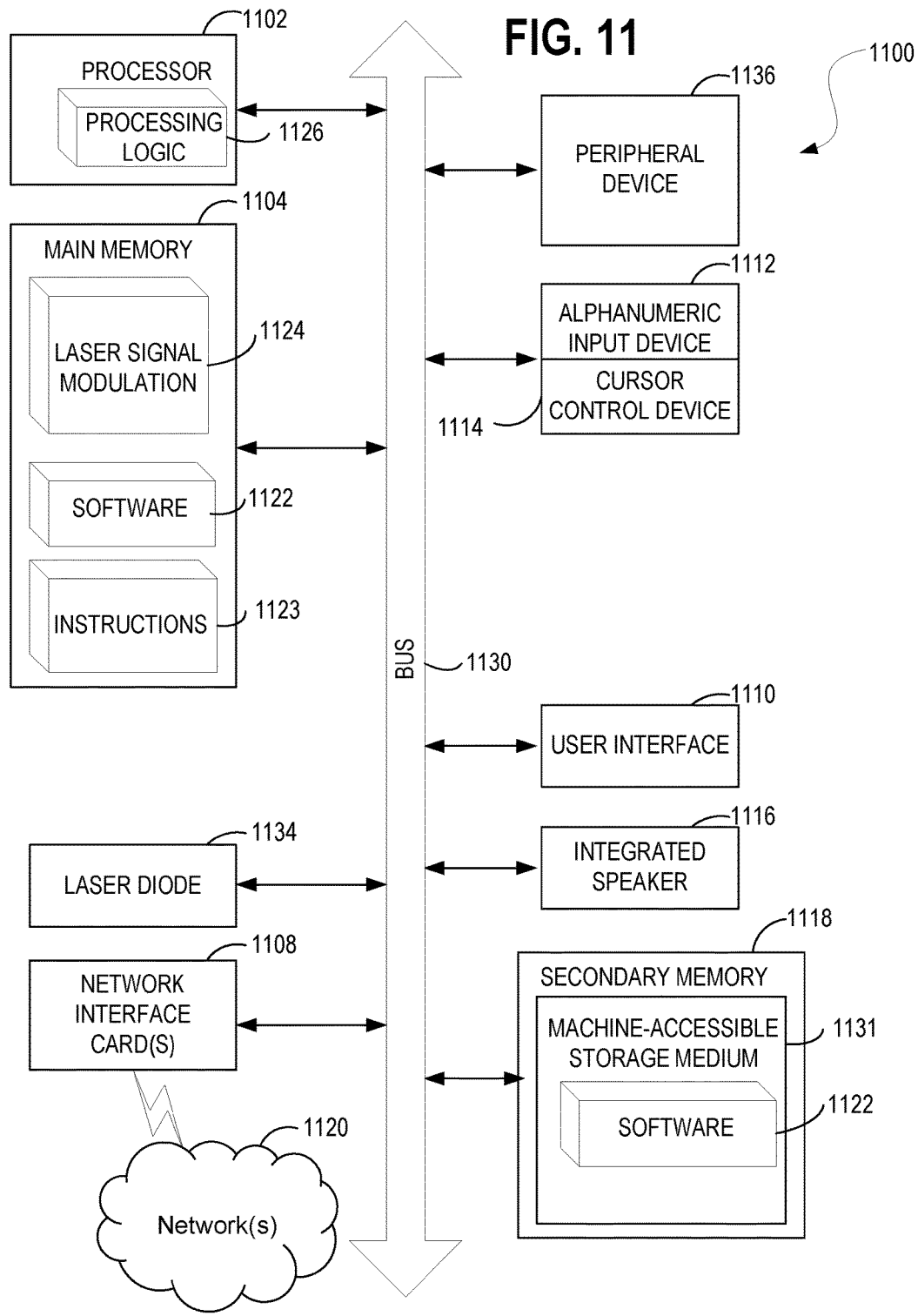

LOW-COST, LONG-DISTANCE, HIGH-BANDWIDTH LASER COMMUNICATION SYSTEM FOR SMALL MOBILE DEVICES AND SPACECRAFT

CLAIM OF PRIORITY

This application is related to, and claims priority to, the provisional utility application entitled "Low-Cost, Long-Distance, High-Bandwidth Laser Communication System for Small Mobile Devices and Spacecraft," filed on Nov. 16, 2015, having an application No. 62/255,995, the entire contents of which are incorporated herein by reference.

GOVERNMENT RIGHTS

Not applicable.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for low-cost, long-distance, high-bandwidth laser communication system for small mobile devices and spacecraft.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Miniaturization of space technology particularly electronics, CCDs and various science instruments have allowed for increased pixel scale resolution, giving higher fidelity data. This has translated into a significant increase in the data generated and requires the communication data bandwidth to enable retrieval of this data to a ground station. The number of communication pipelines to spacecraft beyond Low Earth Orbit is limited, often relying on a few ground stations such as the NASA Deep Space Network. These ground stations have high costs associated with their maintenance and maintain priority for flagship and important exploration missions. Alternate modes of communication that are not reliant on Radio Frequency (RF) or the Deep Space Network open new opportunities both through government and commercial entities.

Satellite and other long distance communication have historically been conducted via well known radiofrequency (RF) transmissions which carry with them many significant benefits.

However, such RF transmission communications present certain challenges for small devices and robots due at least in part to the attenuation of the transmitted signal which can significantly degrade the signal over distances such that small receiving devices and receiving robots are unable to decipher or even recognize receipt of a transmitted signal.

Laser communications have the potential to provide higher bandwidth when implemented on a spacecraft. Unfortunately, power requirements for lasers can be significant, thus undermining their feasibility and practicality for many devices, robots, and spacecraft. Many spacecraft have significant power constraints, and as such, powering a laser for the purposes of communications simply exceeds the power budget available and therefore provides an infeasible solution. Other platforms such as small robots likewise lack the power budget capable of powering laser communications.

A solution is therefore desirable which negates the power requirements of such a laser communications system on spacecraft and other platforms such as robotics, yet nevertheless allows for some of the advantages which are realized with such laser communication platforms.

The present state of the art may therefore benefit from systems and methods for implementing and operating low-cost, long-distance, high-bandwidth laser communication systems for small mobile devices and spacecraft as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 1B illustrates an alternative exemplary system architecture in which embodiments may operate;

FIGS. 10A and 10B depict flow diagrams illustrating methods for implementing and operating low-cost, long-distance, high-bandwidth laser communication systems for small mobile devices and spacecraft in accordance with described embodiments; and FIG. 11 illustrates a diagrammatic representation of a machine in the exemplary form of a computer system, in accordance with one embodiment.

DETAILED DESCRIPTION

Figure 1A:
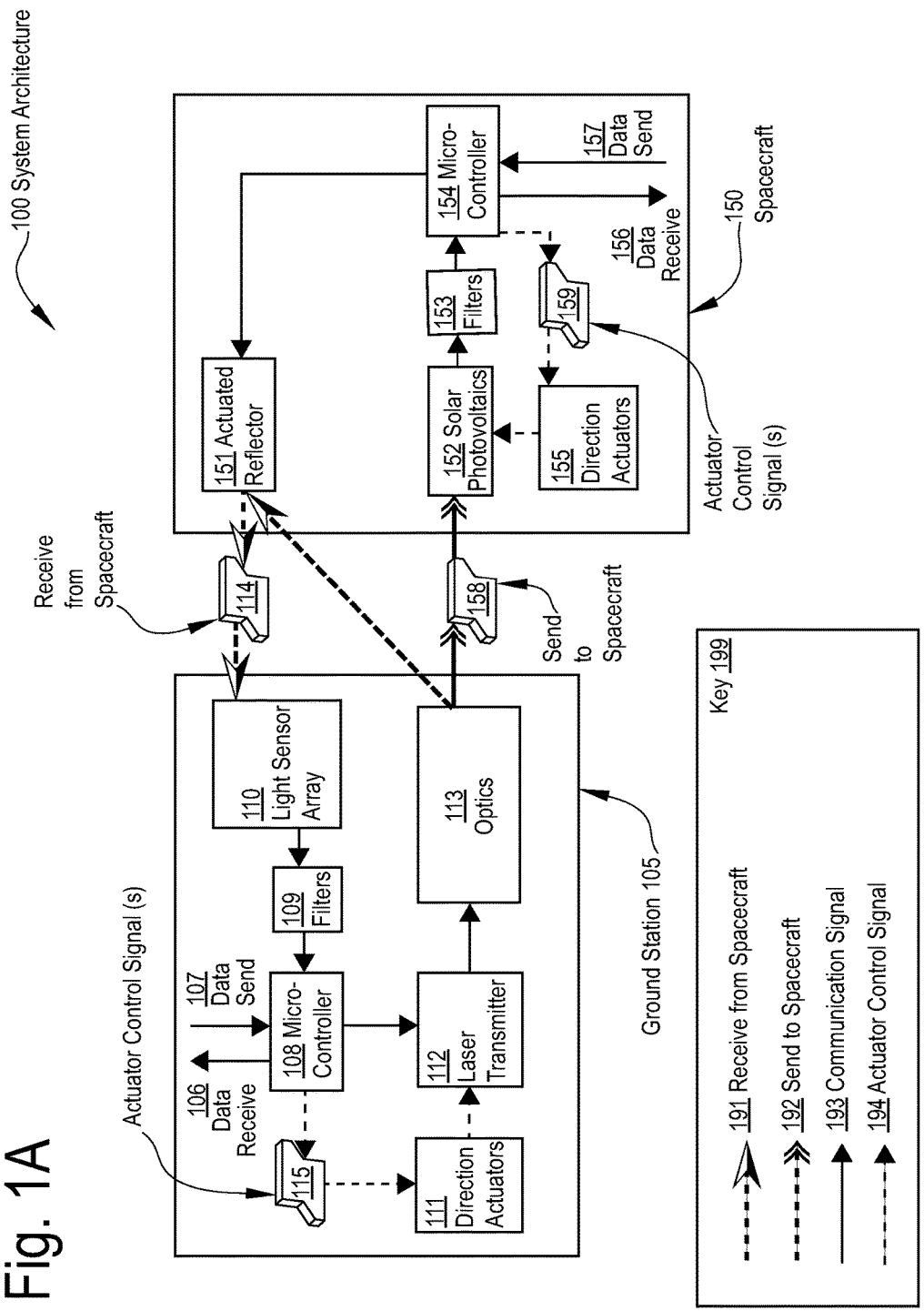
FIG. 1A illustrates an exemplary system architecture in which embodiments may operate.

Described herein are systems and methods for implementing and operating low-cost, long-distance, high-bandwidth laser communication systems for small mobile devices and spacecraft. For instance, according to a particular embodiment, such a system includes a first station having therein: (i) a processor and a memory to implement configuration instructions for the system, (ii) a laser origination source, and (iii) a transmitter to transmit a laser signal from the laser origination source from the first station; a second station having therein: (i) a processor and a memory to implement configuration instructions for the system, (ii) a light sensor array to receive the laser signal transmitted from the first station, and (iii) a reflector to reflect back at least a portion of the transmitted laser signal back to the first station; and in which the second station is to modulate the received laser signal transmitted from the first station to encode a message onto the laser signal reflected back to the first station.

The laser communications means described herein provide a potential low-cost, low-mass, low-complexity solution to spacecraft and robot communication in extreme environments providing important potential commercial applications.

Laser communication compared with traditional radio frequency communication methods provide much higher bandwidth with relatively small mass, volume and power requirements. This is possible because laser enable the beams of photons to be coherent over longer distances. Prior solutions, such as the "Lunar Atmosphere Dust and Environment Explorer" or "LADEE" utilized a laser system onboard the spacecraft to perform high-speed bidirectional communication which consumes between 50 and 120 Watts. Unfortunately, such a power budget is far too high for small spacecraft that typically produce a total power budget of less than 20 Watts.

The described laser communications means therefore wholly eliminates the need for a laser on the spacecraft itself, thus simplifying the bi-directional communication system on the spacecraft, significantly reducing its cost, mass, volume and power usage. Moreover, bandwidth may be raised independent of the spacecraft's power budget by increasing the transmit power of the ground station which is not restrained by such limited power budget requirements. Such an approach decouples the ground station from the spacecraft. For nanosatellites and picosatellites, the typical power requirements for sending data at high-speeds is prohibitively high. Thus the described laser communications system provides a low-power, low-mass solution which overcomes prior constraints for such spacecraft and other low-power-budget devices.

For instance, there is described herein a means of laser communication to and from satellites, smalls robots, Unmanned Aircraft Systems or "UAS" (e.g., such as drones or other unmanned aerial systems), each of which is operable to communicate with a ground station. As set forth in greater detail below, satellite, robot, and UAS implementations need not carry a laser source to benefit from the bi-directional communication methodologies as described herein. Stated differently, satellites, spacecraft, robots, and other devices may themselves perform bi-directional laser communication without a laser source or power budget allocation for laser source generation, thus massively reducing the needed power to engage in such bi-directional communications and additionally reducing the complexity and mass of such devices.

According to described embodiments, a laser source is located only at the ground station and thus relieves the satellites, smalls robots, UAS having implemented the described communication means from having to carry the mass of the laser source as well as the need to power the laser generation which is very likely to represent greater power requirements than are typically feasible on such implementations. This enables the satellite or the robot to be simplified in terms of its payload components and additionally in terms of its power requirements, as the described methodologies consume very little power as there is no need for laser generation at the spacecraft or other device communicating with the base station.

According to certain embodiments, bi-directional laser communication is performed by detecting and receiving laser light at solar photovoltaics or photodiodes on a spacecraft remote from the ground station, in which the laser light is beamed or transmitted from such a ground station. According to such an embodiment, the laser light beamed from the ground station and received at the photovoltaics or photodiodes is then reflected back to the ground station in accordance with a coding scheme to produce a coded signal within the laser light reflected back to the ground station. Such a coding scheme thus further supports the described bi-directional laser communication.

The described communication means may additionally be utilized as an emergency communication means in accordance with described embodiments or the bi-directional laser communication means may be utilized as a backup communication channel for commercial satellites, small robots, UAS, and other spacecraft which provide real time, continuous telemetry during deployment and long hibernation modes. In yet other implementations, the bi-directional laser communication means may be utilized as the primary means of communicating with the device from a ground station.

Eliminating the need for an onboard laser and specialized laser detection system reduces cost, reduces complexity, reduces power consumption, and avoids the challenges of a long development cycle and qualification of the technology in extreme environments, particularly high radiation environments.

Table 1 shows a preliminary cost and performance comparison with state of the art commercial communication systems for small spacecraft, as follows:

TABLE 1

Spacecraft Communication System Comparison.

| Low Earth Orbit | Described System | UHF | Lunar Orbit | Described System | S-band |
|---|---|---|---|---|---|
| Distance | 400 km | 400 km | Distance | 384,000 km | 384,000 km |
| Max Data Rates | 1 MBps | 3 MBps | Max Data Rates | 256 KBps | 256 KBps |
| Power Usage | 0.2 W | 25 W | Power Usage | 0.2 W | 40 W |
| Mass on Spacecraft | 0.2 kg | 0.25 kg | Mass on Spacecraft | 0.2 kg | 1.5 kg |
| Cost on Spacecraft | $7,000 | $25,000 | Cost on Spacecraft | $20,000 | $150,000 |

As depicted via the Table 1 above, a comparison is provided for both low earth orbit spacecraft and lunar orbit spacecraft using the described bi-directional laser communication system versus previously known solutions which may otherwise be implemented onto such spacecraft including, for example, UHF and S-Band solutions.

So called UHF or "Ultra high frequency" communications is the International Telecommunication Union (ITU) designation for radio frequencies in the range between 300 MHz and 3 GHz, also known as the decimeter band as the wavelengths range from one meter to one decimeter. Radio waves with frequencies above the UHF band fall into the SHF (super-high frequency) or microwave frequency range. Lower frequency signals fall into the VHF (very high frequency) or lower bands. UHF radio waves propagate mainly by line of sight as they are blocked by hills and large buildings although the transmission through building walls is strong enough for indoor reception. Such UHF signals are commonly utilized for television broadcasting, cell phones, satellite communication including GPS, personal radio services including Wi-Fi and Bluetooth, walkie-talkies, cordless phones, and numerous other applications.

As depicted by Table 1 above, such UHF communications provides a bandwidth advantage over the described system at 3 MBps maximum data rates for UHF versus 1 MBps maximum data rates for the described bi-direction laser communication set forth herein, however, the UHF communication means is at a significant disadvantage in other areas, such as with respect to cost, complexity, power consumption, and mass.

As shown by Table 1 above, while both UHF and the described bi-directional laser communication system are capable of high-bandwidth (3 MBps and 1 MBps respectively) communication data rates at a distance of 400 km, the UHF communication means requires more than ten-fold the power budget, is slightly heavier, and more than three times more costly in terms of financial costs.

Further depicted by Table 1 above are even greater disparities when the described bi-directional laser communication system is compared with S-band communications for spacecraft in lunar orbit at a distance of 384,000 km.

The S-band is part of the microwave band of the electromagnetic spectrum which is defined by an IEEE standard for radio waves with frequencies that range from 2 to 4 GHz, crossing the conventional boundary between UHF and SHF at 3.0 GHz. The S-band is commonly utilized by weather radar, surface ship radar, and some communications satellites, especially those used by NASA to communicate with the Space Shuttle and the International Space Station.

Unlike UHF, the S-band communications provides no advantage in terms of data rate, with both the S-band and the described bi-directional laser communication system operating at 256 KBps. However, the disadvantages are enormous with the power consumption, mass, and financial costs of the described bi-directional laser communication system being a mere fraction of that which is required for conventional S-band implementations.

Given the cost, mass, power, and complexity differences, some spacecraft may benefit from use of the described bi-directional laser communication system as a primary means of communication while others use the described bi-directional laser communication system as a backup or emergency communication means, which supplement more conventional UHF or S-band solutions.

Further still, alternative embodiments may be applied to existing satellites and spacecraft to provide an additional form of uni-directional communication, and thus another viable communications channel by which existing satellites and spacecraft may receive data, in place of Ultra High Frequency (UHF) and without having to modify existing hardware of already deployed satellites which is for all practice purposes simply is not feasible.

Existing spacecraft nearly universally include solar photovoltaics capable of detecting differences in voltage experienced by a photovoltaic panel or other photo-detector components. Because the solar photovoltaics are very large on a satellite, typically having the largest surface area of any component so as to maximize solar energy capture, the process of aiming a ground station generated laser beam toward the spacecraft with the requisite precision is greatly simplified as the large solar photovoltaic panels effectively provide an oversized target.

The described communication means may be particularly important for small spacecraft and satellite implementations such as nanosatellites and picosatellites that are constrained by mass, volume and power as the described techniques enable such platforms to have either primary or secondary communication without requiring dedicated communication hardware.

These and other benefits are described in additional detail below.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device, a traffic aggregation unit, and/or a traffic de-aggregator to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates an exemplary system architecture 100 in which embodiments may operate. More particularly, depicted at FIG. 1A there is a ground station 105 which communicates with spacecraft 150. Alternatively, the spacecraft 150 may be any platform capable of interacting with the ground station utilizing bi-directional laser communications such as described herein, such implementations including any of small robots, satellites, spacecraft, UAS, or other implementations which could benefit from the communication means as described herein.

At ground station 105 there is a microcontroller 108 enabled to receive data 106 and transmit or send data 107, via either a transmitter and receiver or a transceiver, as appropriate for the implementation. Microcontroller 108 operates in conjunction with direction actuators 111 by sending actuator control signals 115 and the microcontroller 108 further operates in conjunction with laser transmitter 112, as shown. The direction actuators 111 in turn work in conjunction with the laser transmitter 112 and optics 113 to transmit and send to spacecraft 158.

The light sensor array 110 is enabled to receive from spacecraft 114 and operates in conjunction with filters 109 which then input to microcontroller 108.

At the spacecraft 150, it is depicted that the solar photovoltaics 152 receive the laser sent to the spacecraft 158 from the optics 113 of the ground station 105. The microcontroller 154 of the spacecraft 150 is enabled to receive data 156 and transmit or send data 157, via either a transmitter and receiver or a transceiver, as appropriate for the implementation. Microcontroller 154 operates in conjunction with direction actuators 155 by sending actuator control signals 159 and the microcontroller 154 further operates in conjunction with the actuated reflector 151 which bounces the laser sent to the spacecraft at element 158 back to the ground station 105 enabling the ground station 105 to receive the bounced or reflected laser 114 from the spacecraft 150 as depicted.

Solar photovoltaics 152 receive the laser sent to the spacecraft as depicted at element 158 which is then processed through filters 153 and then provided as input to the microcontroller 154.

The key 199 depicts the various communications including: receiving from spacecraft 191, sending to spacecraft 192; communication signal(s) 193, and actuator control signal(s) 194.

Such a ground station 105 being equipped with a photo detector and a series of filters 109 to process the light are enabled to signal the microcontroller 108, are enabled to signal the laser source (e.g., laser transmitter 112 via the microcontroller 108) and are further enabled to signal a series of direction actuators 111 (via the microcontroller 108). The depicted direction actuators 111 point the laser receiver and photo detector at the light sensor array 110 towards the target spacecraft 150. The received signal is filtered 109 to gain maximum signal to noise ratio and the data is acquired using the microcontroller 108 which then transmits binary data to other devices connected by wire to the ground station 105. Notably, the laser source (e.g., laser transmitter 112) is only located on the ground station and can send a modulated laser beam to the spacecraft 150 or robot, according to the chosen implementation platform.

Onboard the spacecraft 150 or robot is a laser beam detector, which would nominally be a large solar photovoltaic 152 panel or even photodetector, which are coupled with a bank of filters 153 to process the signal from the photovoltaics 152, as well as an actuated reflector 151, microcontroller 154 and attitude or direction actuator 155 to point the reflector 151 and detector toward the target ground station 105. Data is sent from the ground station 105 carried upon the laser beam (e.g., via a modulated or encoded laser signal) and beamed to the spacecraft 150 or robot. For the spacecraft 150 or robot to send data to the ground station 105, the ground station 105 first sends a continuous laser beam (e.g., a non-modulated bean) to the spacecraft 150 or robot which is then modulated by the spacecraft 150 or robot and reflected back to the ground station 105 by a high-speed switching reflector onboard the spacecraft 150 platform. For instance, a mechanical actuated mirror, DLP, reflective LCD, or other similar devices are capable of modulating and then reflecting back the received continuous non-modulated laser source from the ground station 105.

The send and receive rates may be independent and are not necessarily the same for any given implementation.

Use of a laser source to generate the laser light is well suited for the depicted ground station 105 as there is a ready and abundant supply of power whereas the remote spacecraft 150 or other such remote device will generally be power constrained and would therefore benefit from offloading its power demands onto the ground station 105. Laser light is therefore well suited to such an arrangement as the ground station 105 is capable of originating the laser which concentrates light in such a way that very little of the light energy is lost even over very long distances. Consider for instance that laser interferometry from the Earth to the moon has been successfully demonstrated for approximately 40 years.

The depicted system therefore leverages the benefits of laser for the purposes of communication between the depicted ground station 105 and a remote device such as a small CubeSats, spacecraft, or even smaller devices present in space while at the same time providing an arrangement where the power consumption requirements are not necessarily reduced, but are instead offloaded from the small remote devices such as a remote spacecraft and instead provided for by the earth based ground station which is not so limited in terms of power availability.

Previous solutions such as the laser communication solution implemented by the LADEE spacecraft several years ago demonstrated very high data rates from the vicinity of the moon back to an Earth based ground station, however, the LADEE system required an onboard powerful and high energy consuming laser origination source.

While it is feasible that certain spacecraft possess sufficient power generation capabilities to power a high energy laser origination source, the reality is that most spacecraft simply do not possess such capabilities due to their cost, complexity, mass, and size.

For instance, many modern spacecraft are required to consume less than 50-60 watts of total power, rendering an onboard laser origination system infeasible. However, by offloading the laser origination from the spacecraft 150 to the ground station 105 it is possible to both reduce the total power requirements for the spacecraft 150 while simultaneously enable bi-directional laser communication with such a spacecraft 150.

Unlike RF signal transmissions which dissipate and therefore require transmission of increasingly high-strength RF signals the farther distant the spacecraft is from the ground station 105, the laser light is sufficiently concentrated that it may be transmitted from the ground station 105, received via the photovoltaic arrays or photo-detectors of the spacecraft 150, and then interpreted as a received encoded signal or modulated and reflected back in the case of the spacecraft receiving a continuous source laser signal which is then to be modulated/encoded by the spacecraft to transmit a return message or a message from the spacecraft 150 back to the ground station 105.

Another problem with RF transmissions is that they require a very large receiving dish on the spacecraft which adds mass to the spacecraft. Conversely, laser transmissions from the ground station to the spacecraft may be received by already existing photovoltaic arrays or photo-detectors and thus, by providing a dual purpose for such components, the added mass is minimal as the net increase in mass is limited to the direction actuators 155, filters 153, and micro-controller 154 for the bi-directional laser communication system of the spacecraft 150.

While RF transmissions can provide communications over vast distances, the bi-directional laser communication system described herein fills a particular niche in which the laser based system is capable of providing equal or potentially higher data bandwidth communications over medium distances versus conventional RF systems.

FIG. 1B illustrates an alternative exemplary system architecture in which embodiments may operate.

In particular, a ground based laser transmitter and receiver 198 is depicted as engaging in bi-directional laser communication with each of the unmanned aircraft system (UAS) or drone 172 via Earth based laser communication 181 (e.g., between the ground and the UAS). There is further depicted the satellite 173 in which the ground based laser transmitter and receiver 198 is engaged in laser communication with the satellite as depicted at element 182. Such a satellite may be in low earth orbit (LEO) or medium earth orbit (MEO) or geosynchronous orbit (GSO), etc. Still further depicted are the ground based laser transmitter and receiver 198 engaged in laser communication with a ground based vehicle or robot as depicted by element 184 depicting bi-directional laser communications with the autonomous ground roving vehicle 171 as depicted at the lower right side of the figure.

Additional implementations, although not depicted here, may utilize a laser generation source upon a spacecraft around a planetary body or a space object which communicates with a ground based device, such as a rover or other autonomous or unmanned ground based system on a space body (e.g., such as a natural satellite, asteroid, moon, planet, etc.) in which the spacecraft based laser generation source operates in place of the previously described Earth based ground system and communicates to a ground based device via laser communication in the manner described herein. Moreover, it is not essential that the ground station be specifically on the ground as the described communication means would operate equally well if positioned upon a sea vessel, aircraft, atop a building or tower, etc.

Other embodiments are equally supported where a laser origination point is responsible for providing or transmitting the laser to a remote device which is then capable to either receive a modulated signal from the laser origination point or receive a non-modulated signal (e.g., a signal modulated to a continuous "high" signal) and modulate and then reflect back a modulated signal carrying information from the remote device back to the laser origination point.

Figure 2:
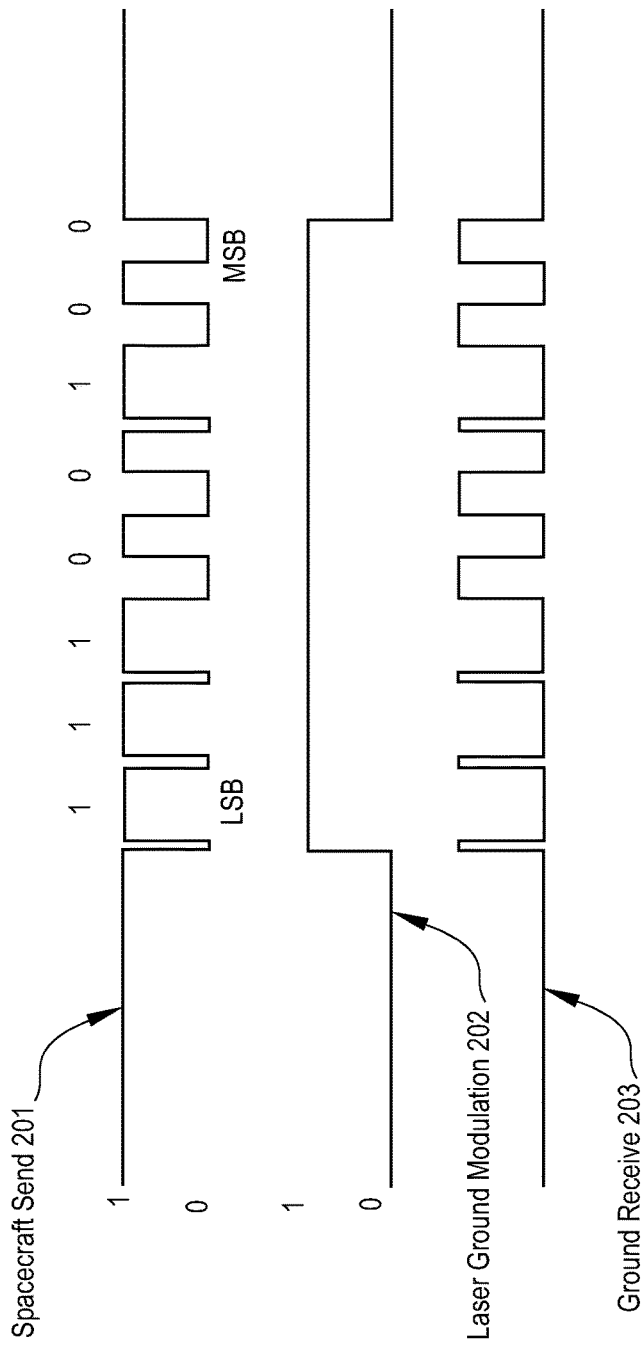
FIG. 2 illustrates receiving data from a spacecraft in accordance with which embodiments may operate.

FIG. 2 illustrates receiving data 200 from a spacecraft in accordance with which embodiments may operate. In particular, there is depicted the intended spacecraft send 201 signal (which is not yet sent) in the top most position representing the signal that a spacecraft is to send or transmit from the spacecraft to the ground station.

The laser on the ground is modulated to "high" and beamed to the spacecraft as is depicted by the laser ground modulation 202 signal in the center position, resulting in the spacecraft now having received a laser signal capable of being reflected or returned back by the spacecraft to the ground station, yet without the spacecraft having actually generated or power the laser signal itself.

As can be seen, the laser ground modulation 202 signal is modulated to "high" and transmitted effectively as a continuous signal, that is to say, the ground station transmits an effectively un-modulated or unbroken signal to the spacecraft.

The spacecraft then reflects back the laser signal, labeled as the ground receive 203 signal in the bottom most position, thus, communicating the intended signal from the spacecraft to the ground station via laser communication without the spacecraft having generated or powered the laser upon which the data is carried and communicated to the ground station.

A communication protocol is depicted via the ground receive 203 signal upon which the ground station is to receive data from the spacecraft (e.g., at the ground station).

As shown here, the modulated "high" signal transmitted from the ground station to the spacecraft is received by the spacecraft and modulated via the actuated mirror or actuated reflector (e.g., see element 151 of FIG. 1A) operating under the control of a microcontroller (e.g., see element 154 of FIG. 1A) thus causing the received continuous laser ground modulation 202 signal or modulated "high" signal received by the spacecraft from the ground station to be broken up or "modulated" or "encoded" with a binary signal of 1's and 0's ranging from the Least Significant Bit (LSB) to the Most Significant Bit (MSB) as shown, here effectively modulating the received "high" modulated signal from the ground station of all 1's (e.g., a continuous high signal as depicted by the laser ground modulation 202 signal) into a combination of 1's and 0's resulting in the signal "[LSB] 1 1 1 0 0 1 0 0 [MSB]" being transmitted by the spacecraft to the ground station without having to generate or originate a laser signal at the spacecraft.

Figure 3:
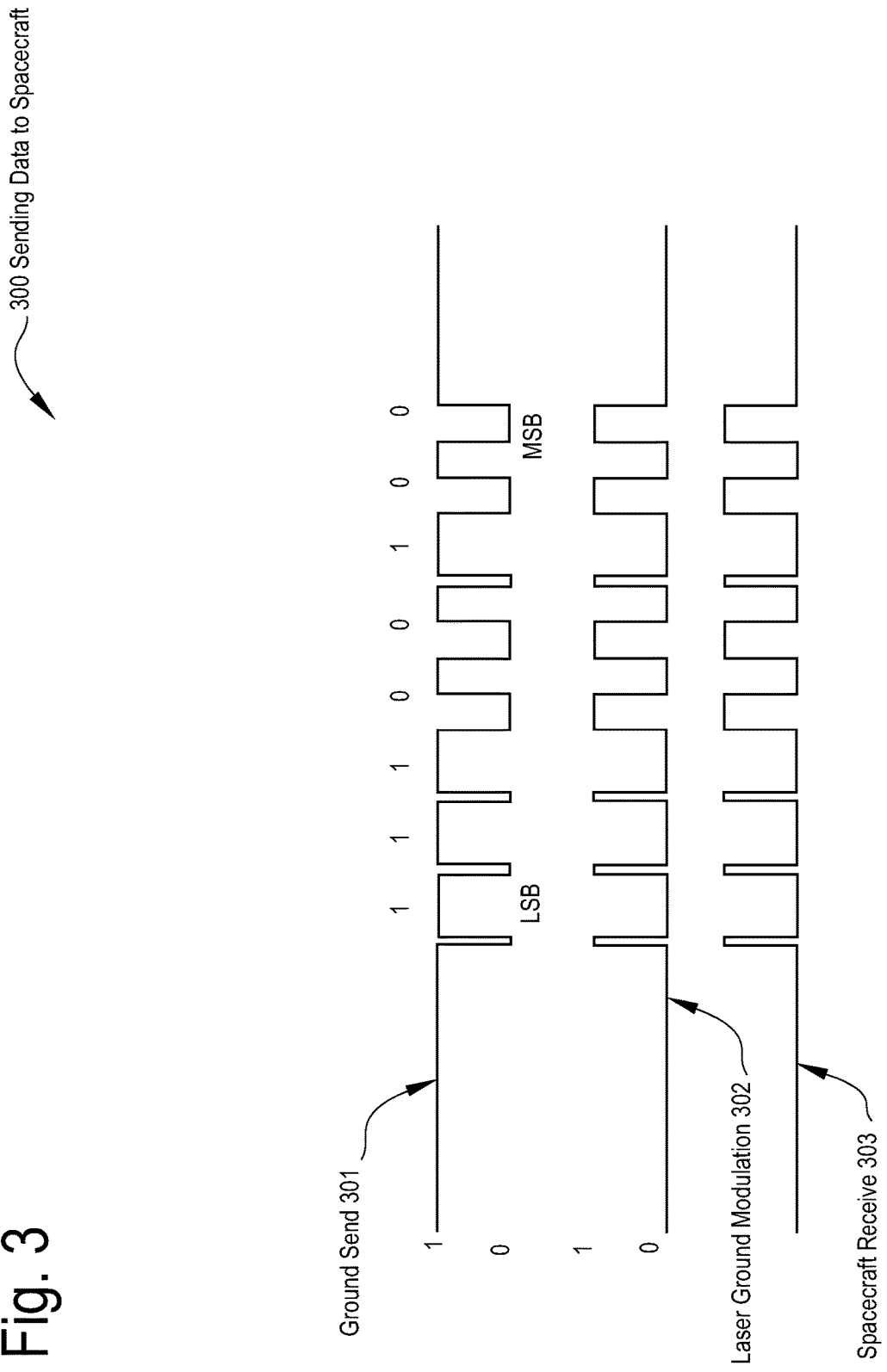
FIG. 3 illustrates sending data to a spacecraft in accordance with which embodiments may operate.

FIG. 3 illustrates sending data 300 to a spacecraft in accordance with which embodiments may operate.

Sending data to the spacecraft is depicted via the laser being modulated at the origination point (e.g., at the ground station) so as to beam the binary signals from the ground station to the spacecraft with the ground send 301 signal depicted in the top most position representing the signal to be sent. The ground station then modulates a laser signal producing laser ground modulation 302 resulting in the signal "[LSB] 1 1 1 0 0 1 0 0 [MSB]" being transmitted from the ground station to the spacecraft with the spacecraft receive 303 signal in the bottom most position representing the received signal from the ground station.

A communication protocol is thus depicted for sending data to the spacecraft (e.g., from the ground station).

At the spacecraft, it is not necessary for the receiving components to utilize specialized sensors nor is it necessary for the spacecraft to necessarily engage in bi-directional laser based communications. Rather, it is possible that the spacecraft receive only uni-directional laser communications as an emergency or backup means of communication.

Such an implementation is especially beneficial to previously deployed satellites which are programmable to receive and decipher signals transmitted from a ground station but do not possess the requisite actuators, reflectors, and microcontrollers to modulate and reflect back a received continuous laser signal by which to modulate and reflect back a modulated signal as was depicted at FIG. 2.

Regardless of whether or not a spacecraft possesses the ability to transmit back a signal, the spacecraft configured in accordance with described embodiments are operable to receive a signal from a ground station.

According to particular embodiments, a modulated signal is received at the spacecraft from a ground station via existing solar panels on the spacecraft.

For newly developed and yet to be deployed space assets it is a simple matter to incorporate the necessary signal reflectors or actuated mirrors and microcontroller capable of receiving, modulating, and reflecting back a remotely generated laser, however, where spacecraft have already been deployed, it simply is not feasible to introduce such new hardware elements. However, it is possible to re-configure their firmware and software in such a way that they may receive, detect, and decipher or interpret received modulated laser signals beamed from a ground station to the spacecraft by interpreting differences in electrical signals received at the pre-existing solar photovoltaic arrays or photo-detectors of such spacecraft.

Figure 4:
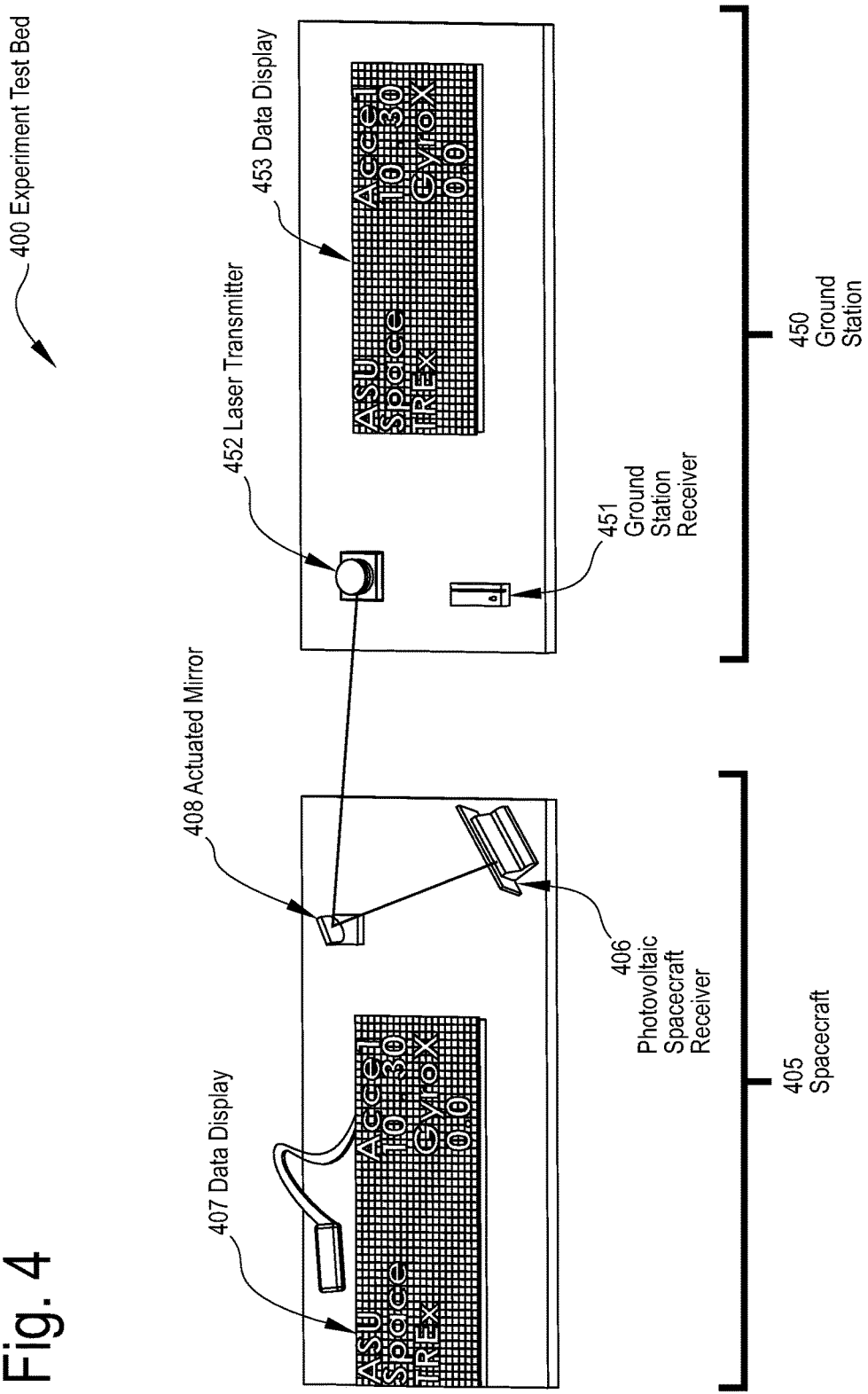
FIG. 4 illustrates an exemplary experimental test bed in accordance with which embodiments may operate.

FIG. 4 illustrates an exemplary experimental test bed 400 in accordance with which embodiments may operate. In particular, there is depicted on the left the spacecraft 405 components which include the photovoltaic spacecraft receiver 406 and the actuated mirror 408 and the data display 407. Notably, there is no laser generation source within the spacecraft 405 components despite the communications taking place via laser.

On the right hand side of the figure depicting the ground station 450 components there is a ground station receiver 451 and a laser transmitter 452 operating as the laser generation source as well as a data display 453.

The depicted laboratory proof of concept demonstration thus demonstrates the spacecraft 405 components utilizing a laser beam receiver which consists of a photovoltaic panel, a bank of filters and amplifiers to detect the laser signal and microcontroller. In the depicted configuration, the ground station 450 components and spacecraft 405 components are separated by less than 20 centimeters, however, in situ, the laser beam would consume significantly more power and transmit at higher power intensities and would additionally be focused using a series of optics to ensure requisite coherence over hundreds of thousands of kilometers.

Figure 5:
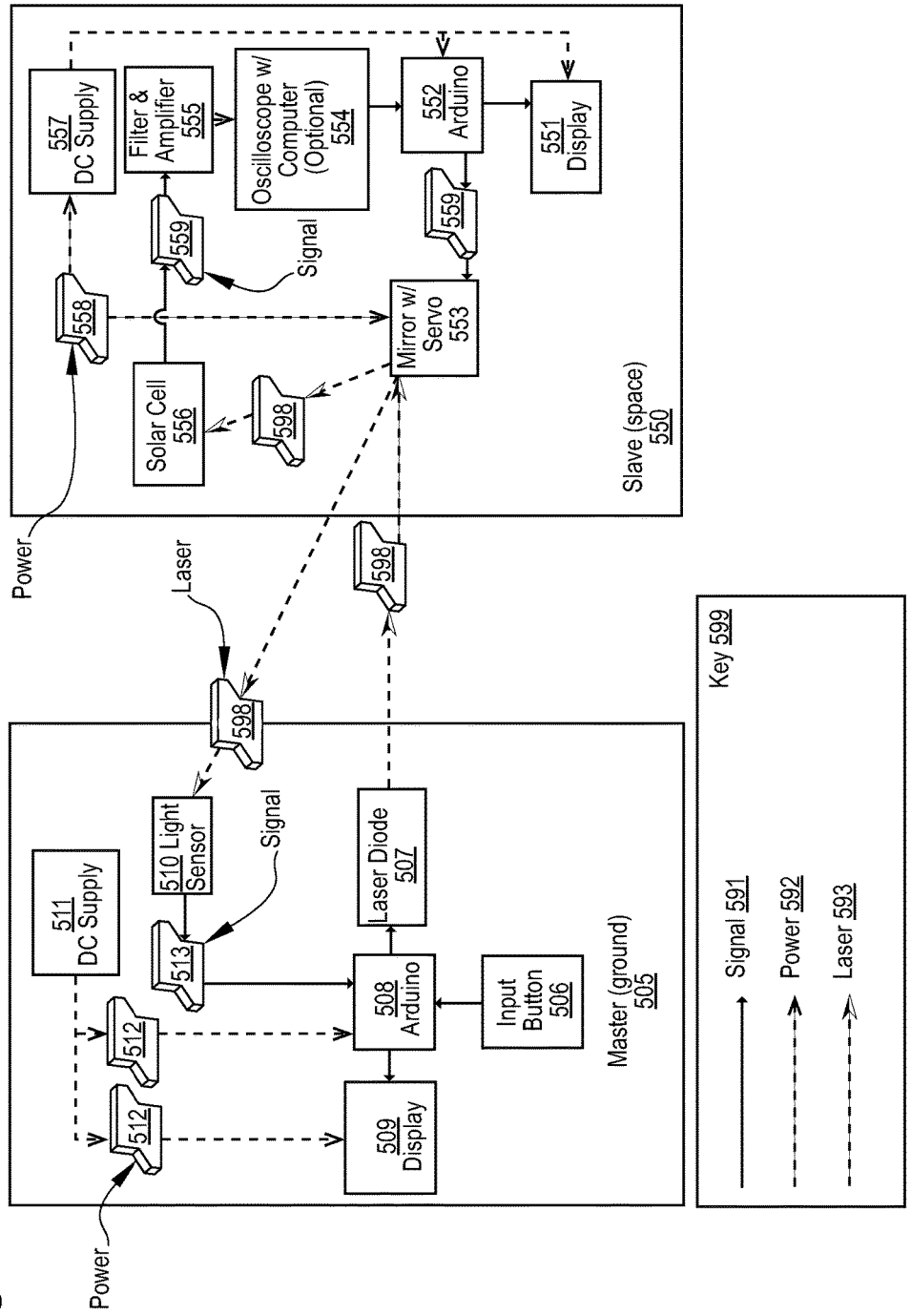
FIG. 5 illustrates an exemplary experimental test bed architecture in accordance with which embodiments may operate.

FIG. 5 illustrates an exemplary experimental test bed architecture 500 in accordance with which embodiments may operate. In particular, there is depicted the master (ground) at element 505 and the slave (space) at element 550. The key 599 depicts the various communications including signal(s) 591, power 592, and laser 593.

Within master 505 there is a DC supply 511 to provide power 512 to the display 509 and the Arduino microcontroller 508. Arduino is in reference to the open-source computer hardware and software project and user community that designs and manufactures microcontroller-based kits for building digital devices and interactive objects that can sense and control objects in the physical world. Other microcontroller types and implementations may readily be utilized in place of Arduino.

The master 505 receives laser at the light sensor 510 which signals 513 the Arduino microcontroller 508 which in turn instructs and controls the display 509 and laser diode 507. The laser diode 507 transmits laser 598 in response to the instructions provided by the Arduino microcontroller 508. The Arduino microcontroller 508 may receive input signals from input button 506.

At the slave 550 the laser 598 transmitted from the laser diode 507 of the master 505 is reflected by the mirror with servo 553 back to light sensor 510 at the master 505 and also reflected to the solar cell 556 of the slave 550 which responsively provides signal 559 to the filter and amplifier(s) 555 which is optionally coupled with the oscilloscope and computer 554 which in turn is coupled with another Arduino microcontroller 552 at the slave 550 which signals the mirror with servo 553 and also signals the display 551. The DC power supply 557 of the slave 550 provides DC power 558 to the mirror with servo 553 and to the Arduino microcontroller 552 and to the display 551 as depicted.

Novel aspects as described therefore include the light weight, small volume and low power consumption on the spacecraft resulting in the mass, volume, power, and development time being saved on the satellite which in turn may yield greater payload capacity. Further novel aspects include the ability for high speed communications at dramatically lower power. Because laser light has very good coherence, it requires much less power for laser system communications in comparison to a comparable radio frequency system to reach the same communication speeds. Still further, existing hardware on previously deployed spacecraft and satellites, which cannot feasibly be modified, are re-used and re-purposed to enable laser based communication where they were unable to communicate via laser previously, thus providing an emergency and backup communications channel in at least one direction (from the ground station to the spacecraft) using only a software reconfiguration. Where the reflectors, actuators, and microcontrollers are already implemented within existing space assets, robots, or other such devices, the system is enabled to communicate via two-way laser communications, thus providing a new bi-directional communication channel, side-channel, or backup communication channel, depending on the other capabilities of such spacecraft.

New spacecraft may be provisioned with the necessary components to provide the bi-directional communication channel via laser communications without requiring the spacecraft to carry a laser generation source, with such communication means operating as either a primary or backup communication channel for the spacecraft.

Repurposing and reuse of existing equipment includes, for example, using the solar cell of new or existing spacecraft as a light detector, which will not impose additional cost on mass or volume. Solar panels have the largest surface area of any component on the spacecraft and can be accurately pointed, thus enabling maximize optical reception from a laser system.

Figure 6:
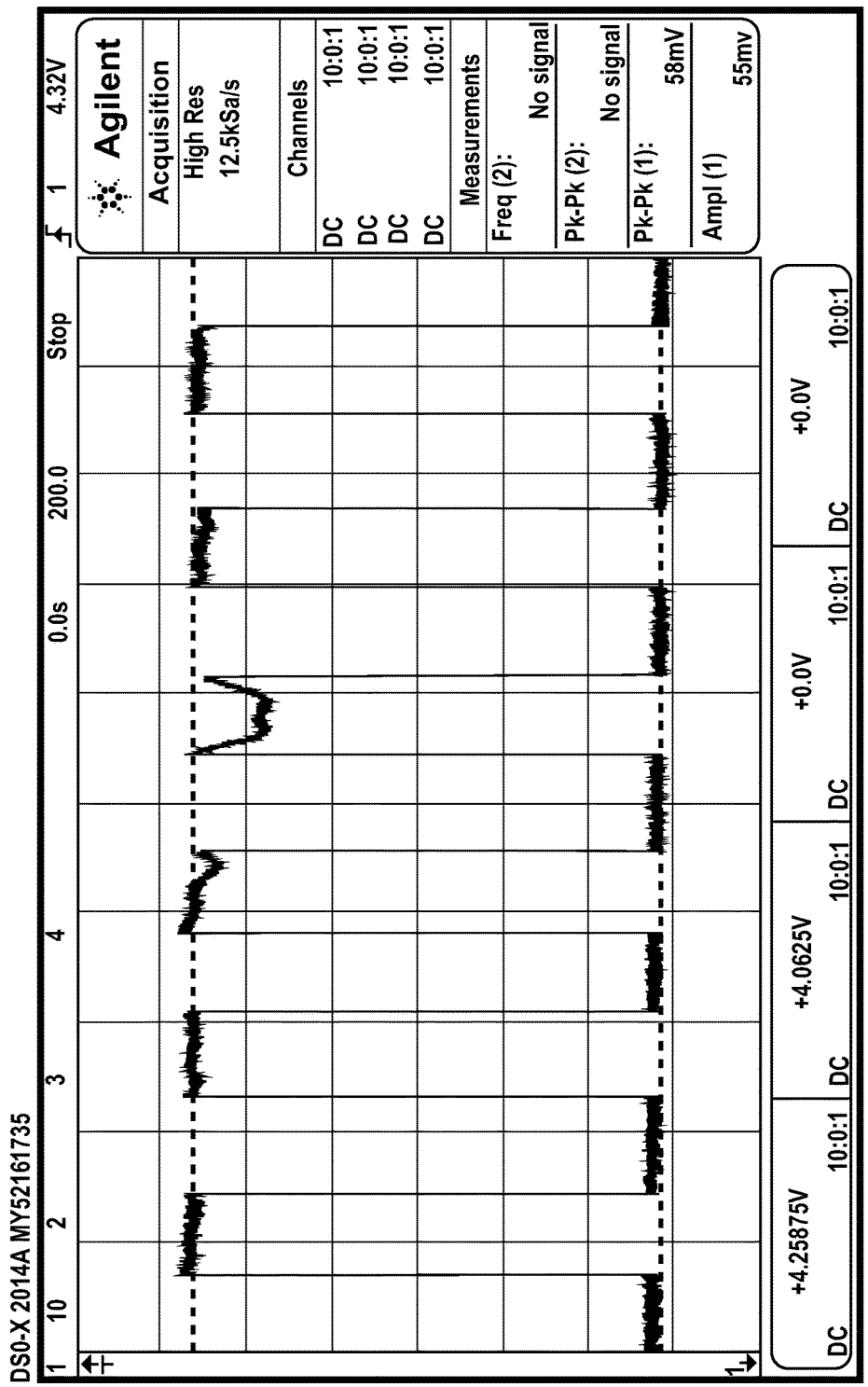
FIG. 6 illustrates a violet laser square wave detected using a silicon solar cell in accordance with which embodiments may operate.

FIG. 6 illustrates a violet laser square wave detected using a silicon solar cell 600 in accordance with which embodiments may operate. In particular, the results of a field deployment outside of the laboratory is depicted in which the described system was tested outside of the laboratory to evaluate whether the proposed laser communication approach, that is to say, the dual use of a solar photovoltaic array by repurposing and reusing existing solar panels for producing solar power at a spacecraft while simultaneously utilizing the same existing solar panels as large receivers for laser based communications. This particular experiment was conducted utilizing a violet laser.

A square wave signal from the violet laser is shown as detected using silicon solar cell, outdoors in Phoenix Ariz., in the shade on a July day.

Based on the signals detected with peak to peak of 58 mV, it is clear that with the right digital signal processing equipment it is possible to read the signal and perform laser communication.

Because the spacecraft are very far away from the laser origination point (e.g., the ground station), it is necessary for them to have a large receiver. While laser light is very concentrated and does not dissipate to the same degree as RF communication signals, it is not perfectly concentrated and thus will diffuse to some extent. Consequently, a larger surface area receiver is preferable. Consequently, the pre-existing solar photovoltaic arrays of spacecraft are an ideal receiving surface as they are both large and because they additionally can detect and decipher differences in electrical power received.

Moreover, laboratory results demonstrate that it is possible to differentiate between received sunlight at the solar photovoltaic arrays and different types of laser light produced at and transmitted from a ground station to the solar photovoltaic arrays.

For instance, a solar photovoltaic array presently receiving sunlight and generating power may nevertheless be simultaneously utilized to receive violet laser light beamed from a ground station and differentiate the received signal.

Figure 7:
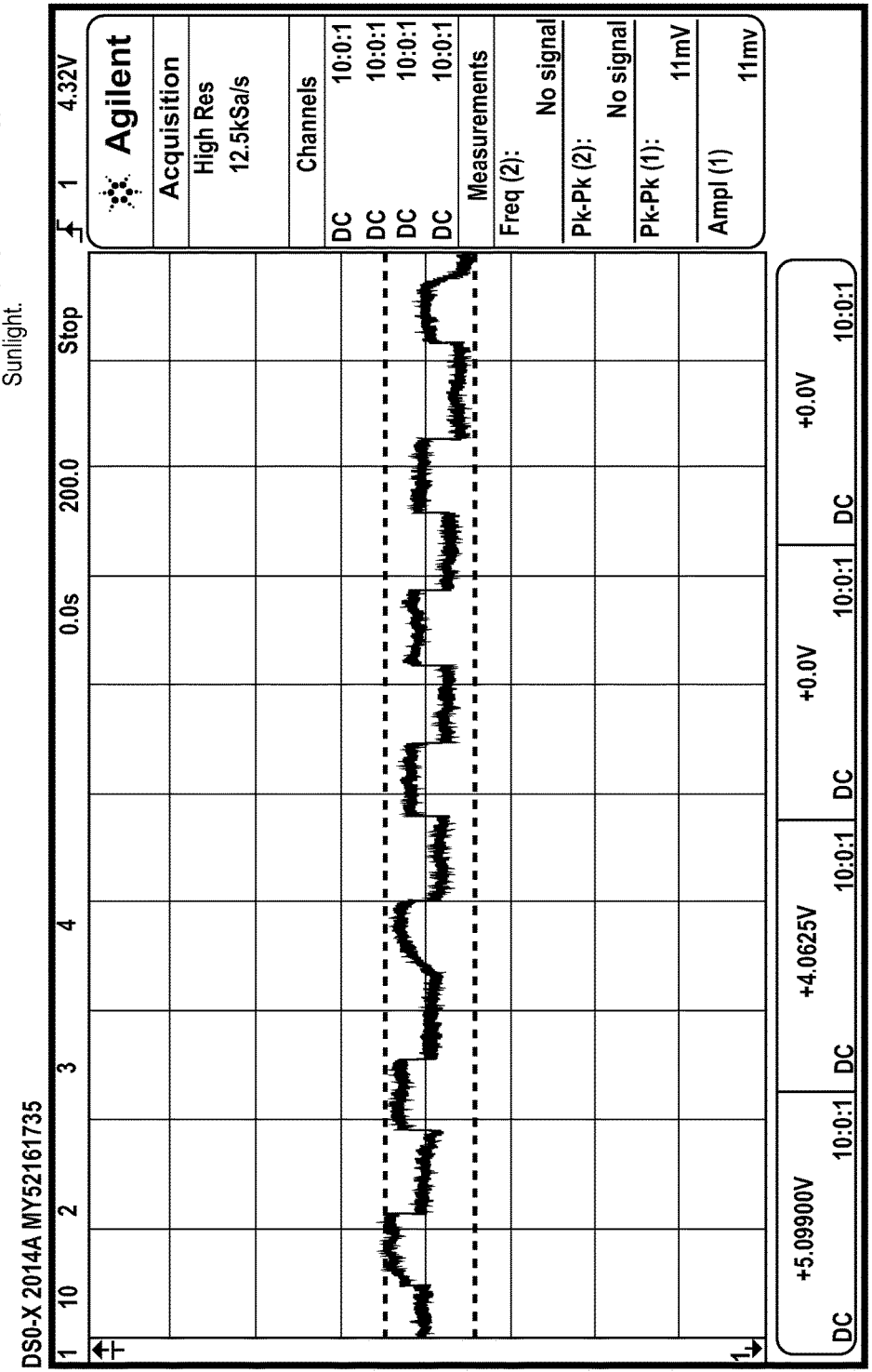
FIG. 7 illustrates a violet laser square wave detected using a silicon solar cell in which embodiments may operate.

Both laboratory results such as those depicted by FIG. 4 and also in-situ field experiments such as those which are shown at FIGS. 6 and 7 demonstrate that it is possible to beam laser light for the purposes of laser based communications and receive and differentiate the received laser communications signal (transmitted here utilizing violet laser light) from simultaneously received sunlight being captured and converted to electrical energy.

As shown here, a received signal which is filtered and amplified produces a very strong signal easily decipherable for the violet laser square wave detected by a silicon solar cell outdoors in the shade.

FIG. 7 illustrates a violet laser square wave detected using a silicon solar cell 700 in which embodiments may operate.

The same experiment from FIG. 6 was repeated in full sunlight with its results depicted here.

As can be seen, a square wave signal from the violet laser is shown as detected using silicon solar cell, outdoors in Phoenix Ariz., in direct sunlight, on a July day. The square signal from the laser is once again detectable and decipherable. Although amplitude has decreased to peak to peak of 11 mV, the received signal remained more than sufficient for the right digital equipment to discern the signal from background sunlight arriving at the solar photovoltaic array.

According to certain embodiments, pre-existing solar photovoltaic arrays are wired up to fault detection components which are capable to detect and identify faults within a pre-existing solar photovoltaic array of an already deployed spacecraft. For instance, such fault detection components and circuitry may include circuitry by which to isolate and identify specific cells within the solar panels identified as faulty or defective, etc.

According to particular embodiments, such fault detection circuitry and components are re-purposed through a change to their firmware or control software so as to differentiate between received laser light (e.g., such as the violet laser light received by the solar photovoltaic cells for the purposes of laser based communications) and sunlight received simultaneously at the solar photovoltaic cells for the purposes of power generation.

For instance, the fault detection components and circuitry may be re-purposed to output a signal or bitstream or output strings corresponding to the received modulated laser signal which may then be consumed by other components, circuitry, or software onboard such spacecraft.

Such implementations are permissible even where the previously deployed spacecraft lacks the requisite actuators, reflectors, filters, modulators, etc., by which to receive and reflect back a modulated laser signal. Consequently, previously deployed spacecraft may be re-configured to receive laser based communications albeit lack the ability to respond via laser based communications.

Such capabilities are critical in emergency situations where the deployed satellite experiences a fault preventing its standard or primary means of communication from operating properly. For instance, where a satellite is non-responsive to RF based communications on a primary communications channel, it may nevertheless be capable to receive and decipher laser based communications via an emergency, side, or backup communications channel in the manner described herein, permitting the satellite to receive and execute certain instructions, such as re-orientation, re-configuration, reset/rebooting certain systems, and so forth.

In such a way, even previously deployed space assets limited to uni-directional (e.g., receiving only) laser based communications will nevertheless experience a benefit from practice of the disclosed embodiments.

Figure 8:
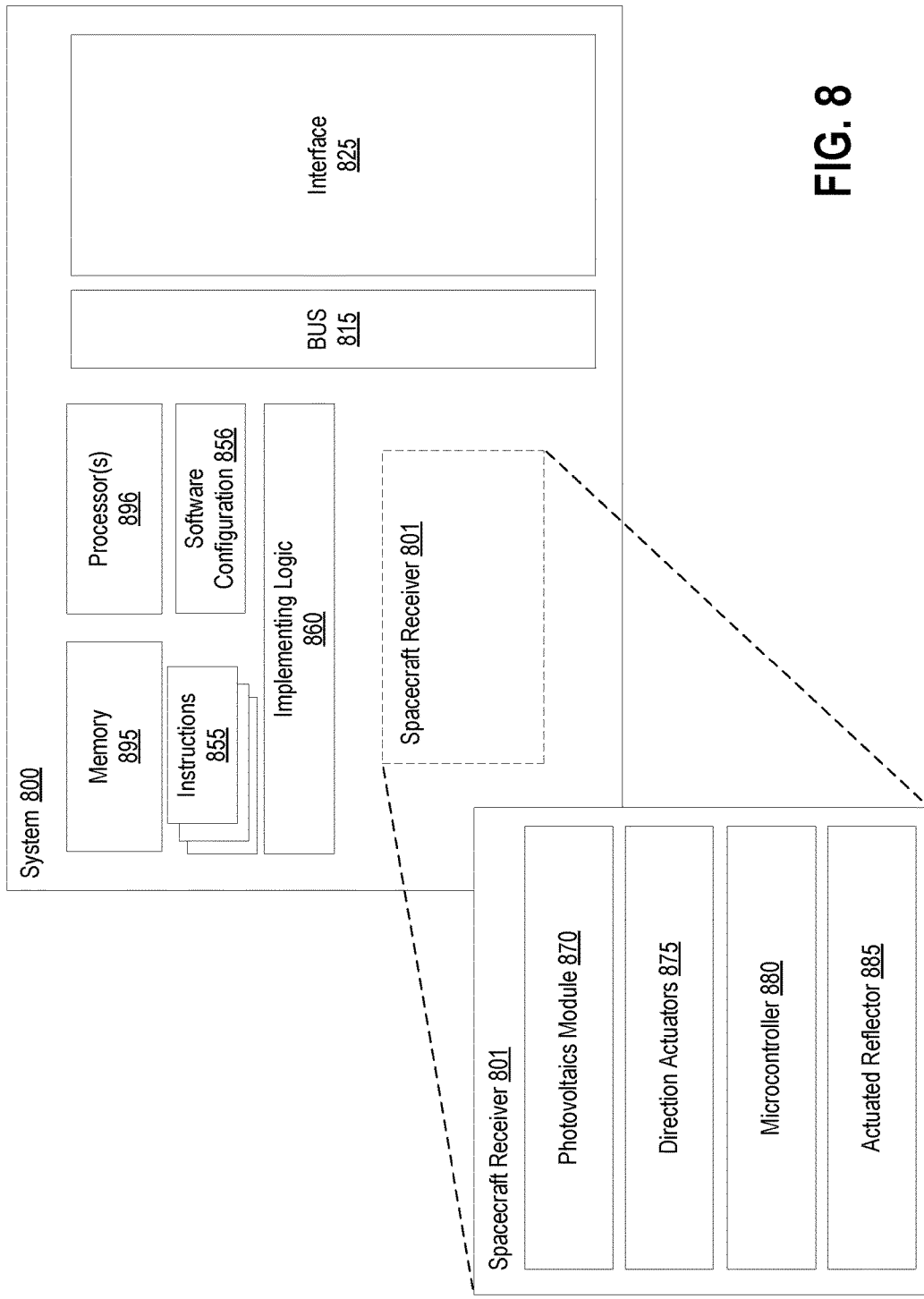
FIG. 8 illustrates a diagrammatic representation of a system in accordance with which embodiments may operate, be installed, integrated, or configured.

FIG. 8 illustrates a diagrammatic representation of a system 800 in accordance with which embodiments may operate, be installed, integrated, or configured.

In one embodiment, system 800 includes a memory 895 and a processor or processors 896. For example, memory 895 may store instructions to be executed and processor(s) 896 may execute such instructions. Processor(s) 896 may also implement or execute implementing logic 860 having logic to implement the methodologies discussed herein. System 800 includes communication bus(es) 815 to transfer transactions, instructions, requests, and data within system 800 among a plurality of peripheral devices communicably interfaced with one or more communication buses 815. In one embodiment, system 800 includes a communication bus 815 to interface, transfer, transact, relay, and/or communicate information, transactions, instructions, requests, and data within system 800, and among plurality of peripheral devices. System 800 further includes interface 825, for example, to receive requests, return responses, and otherwise interface with elements located separately from system 800.

In some embodiments, interface 825 communicates information via an out-of-band channel separate from the laser communications channel and communication means as described herein, where "in-band" communications are communications that traverse the laser communications channel and communication means including transmitting as payload data (e.g., content) which is exchanged with such a system 800 and a ground station. Conversely, "out-of-band" communications are communications that traverse an isolated communication means, separate from the mechanism for communicating the payload data. An out-of-band connection may serve as a redundant or backup interface over which to communicate control data between the system 800 and other elements. The laser communications channel and communication means may serve as either a primary and thus in-band communication or alternatively as a backup and thus, out-of-band communication.

System 800 may further include multiple instructions 855, any of which may be initiated responsive to or in support of the laser communications channel and communication means.

Distinct within system 800 is spacecraft receiver 801 which includes photovoltaics module 870, direction actuators 875, microcontroller 880, and actuated reflector 885. Spacecraft receiver 801 may be installed and configured in a compatible system 800 as is depicted by FIG. 8, or provided separately so as to operate in conjunction with appropriate implementing logic 860 or other software configuration 856.

Figure 9:
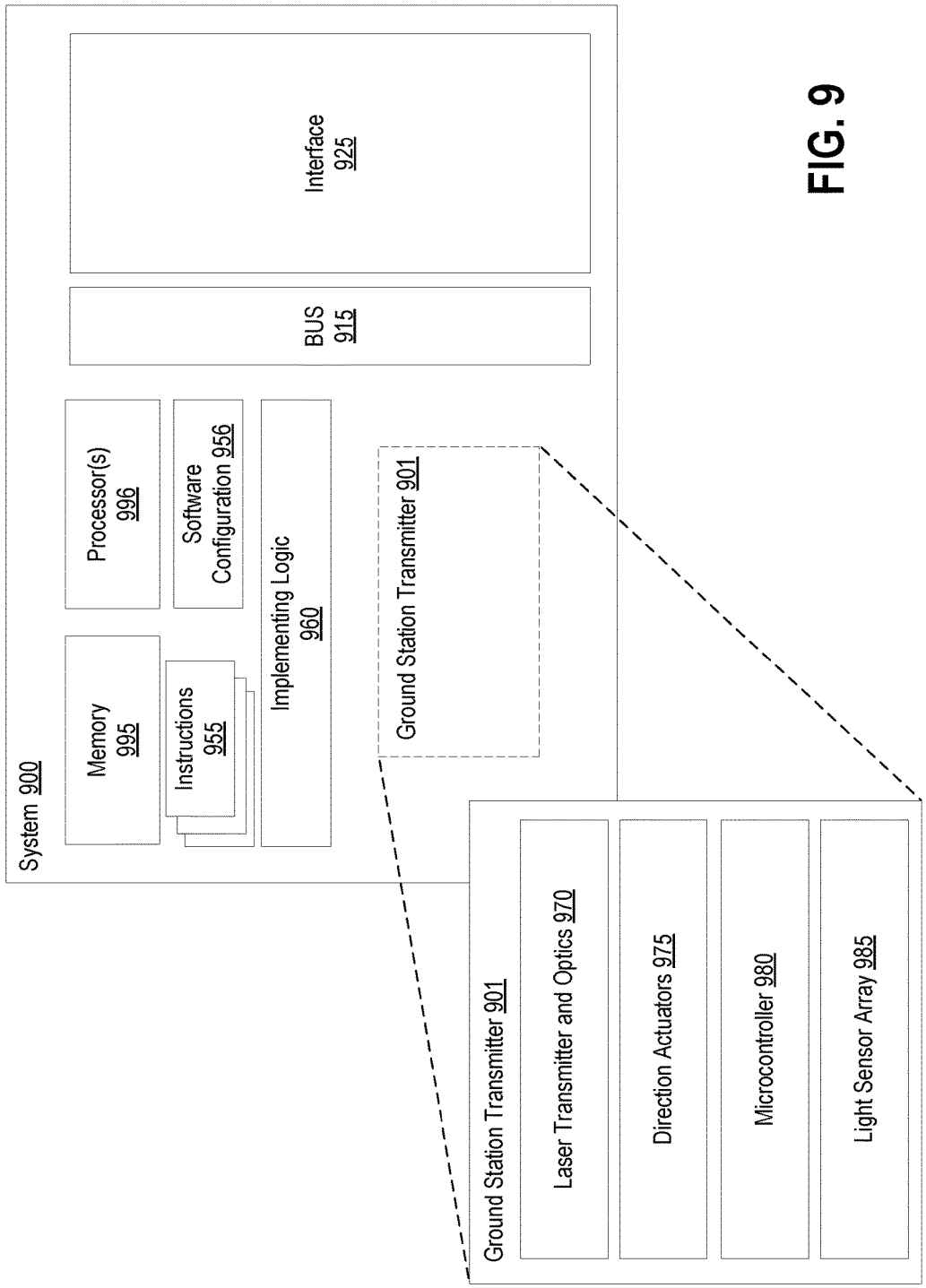
FIG. 9 illustrates a diagrammatic representation of a system in accordance with which embodiments may operate, be installed, integrated, or configured.

FIG. 9 illustrates a diagrammatic representation of a system 900 in accordance with which embodiments may operate, be installed, integrated, or configured.

In one embodiment, system 900 includes a memory 995 and a processor or processors 996. For example, memory 995 may store instructions to be executed and processor(s) 996 may execute such instructions. Processor(s) 996 may also implement or execute implementing logic 960 having logic to implement the methodologies discussed herein. System 900 includes communication bus(es) 915 to transfer transactions, instructions, requests, and data within system 900 among a plurality of peripheral devices communicably interfaced with one or more communication buses 915. In one embodiment, system 900 includes a communication bus 915 to interface, transfer, transact, relay, and/or communicate information, transactions, instructions, requests, and data within system 900, and among plurality of peripheral devices. System 900 further includes interface 925, for example, to receive requests, return responses, and otherwise interface with elements located separately from system 900.

In some embodiments, interface 925 communicates information via an out-of-band channel separate from the laser communications channel and communication means as described herein, where "in-band" communications are communications that traverse the laser communications channel and communication means including transmitting as payload data (e.g., content) which is exchanged with such a system 900 and remote station such as a robot, spacecraft, or satellite. Conversely, "out-of-band" communications are communications that traverse an isolated communication means, separate from the mechanism for communicating the payload data. An out-of-band connection may serve as a redundant or backup interface over which to communicate control data between the system 900 and other elements. The laser communications channel and communication means may serve as either a primary and thus in-band communication or alternatively as a backup and thus, out-of-band communication.

System 900 may further include multiple instructions 955, any of which may be initiated responsive to or in support of the laser communications channel and communication means.

Distinct within system 900 is ground station transmitter 901 which includes laser transmitter and optics 970 capable of generating via a laser diode a laser beam for transmission to a second and remote station, direction actuators 975, microcontroller 980, and a light sensor array 985. Ground station transmitter 901 may be installed and configured in a compatible system 900 as is depicted by FIG. 9, or provided separately so as to operate in conjunction with appropriate implementing logic 960 or other software configuration 956.

FIGS. 10A and 10B depict flow diagrams illustrating methods 1000 and 1001 for implementing and operating low-cost, long-distance, high-bandwidth laser communication systems for small mobile devices and spacecraft in accordance with described embodiments. The methods 1000 and 1001 may be performed by processing logic that may include hardware (e.g., circuitry, dedicated logic, programmable logic, microcode, etc.), software (e.g., instructions run on a processing device to perform various operations such as generating, transmitting, receiving, modulating, actuating, reflecting, encoding, decoding, deciphering, interfacing, collecting, monitoring, diagnosing and reporting information, and executing/initiating instructions, or some combination thereof). In one embodiment, methods 1000 and 1001 are performed or coordinated via system architecture such as that depicted at element 100 of FIG. 1A. Some of the blocks and/or operations listed below are optional in accordance with certain embodiments. The numbering of the blocks presented is for the sake of clarity and is not intended to prescribe an order of operations in which the various blocks must occur. Additionally, operations from methods 1000 and 1001 may be utilized in a variety of combinations.

With reference to method 1000 of FIG. 10A first, method 1000 begins with processing logic for generating a laser signal at a first station having laser origination capability at block 1005.

At block 1010, processing logic transmits the laser signal from the first station to a second terminal, the second terminal having no laser origination capability.

At block 1015, processing logic receives the laser signal via a receiver at the second station.

At block 1020, processing logic modulates the laser signal received at the second station.

At block 1025, processing logic reflects the modulated laser signal back to the first station.

Referring now to method 1001 of FIG. 10B at block 1050, method 1001 implements laser communications between two stations, by the following operations:

At block 1055, processing logic generates a laser signal at a first station via a laser origination source of the first station.

At block 1060, processing logic transmits the laser signal from the first station to a second station.

At block 1065, processing logic receives the laser signal transmitted from the first station at the second station.

At block 1070, processing logic modulates the received laser signal at the second station to encode a message onto the laser signal.

At block 1075, processing logic reflects the modulated laser signal having the message encoded thereupon from the second station back to the first station.

FIG. 11 illustrates a diagrammatic representation of a machine 1100 in the exemplary form of a computer system, in accordance with one embodiment, within which a set of instructions, for causing the machine 1100 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1118, which communicate with each other via a bus 1130. Main memory 1104 includes information and instructions and software program components necessary for performing and executing the functions with respect to the various embodiments of the systems, methods, and laser communications transmission via ground station and receiving via a second station, such as a satellite or spacecraft as described herein. Instructions 1123 may be triggered based on laser signals received or to be transmitted at the direction of a microcontroller. Instructions 1123 may be stored within main memory 1104. Main memory 1104 and its sub-elements (e.g. instructions 1123 and laser signal modulation 1124) are operable in conjunction with processing logic 1126 and/or software 1122 and processor 1102 to perform the methodologies discussed herein, each of which being operable in conjunction with laser diode 1134 if the system as laser origination capability or operable to modulate a received laser signal from a remote station if the system does not have laser origination capability.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which are discussed herein.

The computer system 1100 may further include one or more network interface cards 1108 to interface with the computer system 1100 with one or more networks 1120. The computer system 1100 also may include a user interface 1110 (such as a video display unit, a liquid crystal display (LCD), or a cathode ray tube (CRT)), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.). The computer system 1100 may perform the functions of laser communications transmission via ground station and receiving via a second station, such as a satellite or spacecraft as described herein.

The secondary memory 1118 may include a non-transitory machine-readable storage medium (or more specifically a non-transitory machine-accessible storage medium) 1131 on which is stored one or more sets of instructions (e.g., software 1122) embodying any one or more of the methodologies or functions described herein. Software 1122 may also reside, or alternatively reside within main memory 1104, and may further reside completely or at least partially within the processor 1102 during execution thereof by the computer system 1100, the main memory 1104 and the processor 1102 also constituting machine-readable storage media. The software 1122 may further be transmitted or received over a network 1120 via the network interface card 1108.

It is therefore in accordance with the described embodiments that:

According to a particular embodiment, there is a system for laser communications between two stations, in which the system includes: a first station including: (i) a processor and a memory to implement configuration instructions for the system, (ii) a laser origination source, and (iii) a transmitter to transmit a laser signal from the laser origination source from the first station; a second station including: (i) a processor and a memory to implement configuration instructions for the system, (ii) a light sensor array to receive the laser signal transmitted from the first station, and (iii) a reflector to reflect back at least a portion of the transmitted laser signal back to the first station; and in which the second station is to modulate the received laser signal transmitted from the first station to encode a message onto the laser signal reflected back to the first station.

According to another embodiment of the system, the first station further includes a receiver to receive the message from the second station encoded onto the laser signal reflected back to the first station from the second station.

According to another embodiment of the system, the second station is to: transmit messages to the first station via modulating a laser signal originating from the first station and reflecting back the modulated laser signal from the second station to the first station with an encoded message from the second station; and receive messages from the first station via receiving a modulated laser signal originating from the first station with an encoded message from the first station to the second station.

According to another embodiment of the system, the second station lacks a laser generation source; in which the second station receives incoming messages from the first station via laser signals generated via the laser origination source of the first station; and in which the second station sends outgoing messages to the first station via reflected laser signals generated via the laser origination source of the first station and modulated at the second station.

According to another embodiment of the system, the first station further includes a laser diode to generate the laser signal within the laser origination source, in which the laser signal is originated at the first station and focused via optics of the first station before being transmitted to the second station via the transmitter.

According to another embodiment of the system, the second station includes a spacecraft or satellite having solar photovoltaic panels thereupon; and in which the solar photovoltaic panels of the spacecraft or satellite operate to both generate power for the spacecraft or satellite and operate further to receive the laser signal transmitted from the first station and to communicate a signal based on the laser signal received from the first station to a controller at the spacecraft or satellite.

According to another embodiment of the system, the second station further includes a microcontroller and a modulator; in which the modulator instructs the reflector to modulate the laser signal reflected back to the first station by the reflector of the second station according to instructions from the microcontroller to encode the message onto the laser signal reflected back to the first station.

According to another embodiment of the system, the reflector of the second station includes a mirror directionally actuated by a servo according to instructions from the processor and the memory of the second station; and in which the instructions instruct the servo to encode the message onto the laser signal reflected back to the first station by directionally actuating the mirror to reflect only the portion of the transmitted laser signal back to the first station, the portion of the transmitted laser signal corresponding to a coding scheme to produce a coded signal within the laser light reflected back to the first station.

According to another embodiment of the system, the first station is a ground station on Earth having the laser origination source therein.

According to another embodiment of the system, the second station is one of: a spacecraft; an Unmanned Aircraft System (UAS); a drone; a satellite; a robot capable of movement; a CubeSat having therein one or more commercial off-the-shelf (COTS) components proving electronics and structure; a satellite in Low Earth Orbit; a satellite in Medium Earth Orbit; and a satellite in geosynchronous orbit around Earth.

According to another embodiment, there is a method for implementing laser communications between two stations, in which the method includes: generating a laser signal at a first station via a laser origination source of the first station; transmitting the laser signal from the first station to a second station; receiving the laser signal transmitted from the first station at the second station; modulating the received laser signal at the second station to encode a message onto the laser signal; and reflecting the modulated laser signal having the message encoded thereupon from the second station back to the first station.

According to another embodiment of the method, the second station includes a solar photovoltaic array for receiving sunlight and generating solar power at the second station; and in which the method further includes simultaneously generating the solar power at the second station and receiving the laser signal transmitted from the first station at the second station via the solar photovoltaic array.

According to another embodiment of the method, transmitting the laser signal from the first station to the second station includes transmitting the laser signal line of sight from the first station to the second station.

According to another embodiment of the method, generating the laser signal at a first station via the laser origination source of the first station includes generating a violet laser signal via a laser diode at the first station; and in which transmitting the laser signal from the first station to the second station includes transmitting the violet laser signal from the first station to the second station via a transmitter of the first station.

According to another embodiment, the method further includes: focusing the generated laser signal at the first station via optics of the first station before transmitting the laser signal to the second station; and in which transmitting the laser signal from the first station to a second station includes transmitting the focused laser signal from the first station to the second station via a transmitter at the first station.

According to another embodiment of the method, the first station is a ground station on Earth having the laser origination source therein.

According to another embodiment of the method, the second station is one of: a spacecraft; an Unmanned Aircraft System (UAS); a drone; a satellite; a robot capable of movement; a CubeSat having therein one or more commercial off-the-shelf (COTS) components proving electronics and structure; a satellite in Low Earth Orbit; a satellite in Medium Earth Orbit; and a satellite in geosynchronous orbit around Earth.

According to yet another embodiment, there is a computer readable storage media having instructions stored thereupon that, when executed by a processor and a memory of a ground station, the instructions cause the ground station to perform operations including: generating a laser signal at the ground station via a laser origination source of the ground station; transmitting the laser signal from the ground station to a remote station; in which the laser signal transmitted from the ground station is to be received by the remote station via a light sensor array; in which the remote station is to modulate the received laser signal to encode a message onto the laser signal reflect back the modulated laser signal having the message encoded thereupon to the ground station; and receiving the modulated laser signal having the message encoded thereupon at the ground station.

According to another embodiment of the non-transitory computer readable storage media, the modulated laser signal having the message encoded thereupon is a subset of the laser signal transmitted from the ground station to the remote station and reflected back to the ground station by the remote station.

According to another embodiment of the non-transitory computer readable storage media, the remote station is one of: a spacecraft; an Unmanned Aircraft System (UAS); a drone; a satellite; a robot capable of movement; a CubeSat having therein one or more commercial off-the-shelf (COTS) components proving electronics and structure; a satellite in Low Earth Orbit; a satellite in Medium Earth Orbit; and a satellite in geosynchronous orbit around Earth.

Other variations and combinations are contemplated. For instance, embodiments may include a remote station or a second station lacking a reflector and/or actuators which is enabled to receive a signal transmitted by the ground station via a solar photovoltaic array and decipher or interpret the signal, yet lacks the means by which to respond via laser communications. For instance, such a system may respond via alternative non-laser communication means the response may be to execute computer readable instructions passed with or based upon the received laser signal.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system for laser communications between two stations, wherein the system comprises:
   a first station comprising:
   (i) a processor and a memory to implement configuration instructions for the system,
   (ii) a laser origination source, and (iii) a transmitter to transmit a laser signal from the laser origination source from the first station;

a second station comprising a spacecraft or satellite having solar photovoltaic panels thereupon, the second station comprising:

(i) a processor and a memory to implement configuration instructions for the system, (ii) a light sensor array to receive the laser signal transmitted from the first station, and (iii) a reflector to reflect back at least a portion of the transmitted laser signal back to the first station; and wherein the second station is to modulate the received laser signal transmitted from the first station to encode a message onto the laser signal reflected back to the first station and wherein the solar photovoltaic panels of the spacecraft or satellite operate to both generate power for the spacecraft or satellite and operate further to receive the laser signal transmitted from the first station and to communicate a signal based on the laser signal received from the first station to a controller at the spacecraft or satellite.

2. The system of claim 1, wherein the first station further comprises a receiver to receive the message from the second station encoded onto the laser signal reflected back to the first station from the second station.

3. The system of claim 1, wherein the second station is to:

transmit messages to the first station via modulating a laser signal originating from the first station and reflecting back the modulated laser signal from the second station to the first station with an encoded message from the second station; and receive messages from the first station via receiving a modulated laser signal originating from the first station with an encoded message from the first station to the second station.

4. The system of claim 1:

wherein the second station lacks a laser generation source;

wherein the second station receives incoming messages from the first station via laser signals generated via the laser origination source of the first station; and wherein the second station sends outgoing messages to the first station via reflected laser signals generated via the laser origination source of the first station and modulated at the second station.

5. The system of claim 1, wherein the first station further comprises a laser diode to generate the laser signal within the laser origination source, wherein the laser signal is originated at the first station and focused via optics of the first station before being transmitted to the second station via the transmitter.

6. The system of claim 1:

wherein the second station further comprises a microcontroller and a modulator;

wherein the modulator instructs the reflector to modulate the laser signal reflected back to the first station by the reflector of the second station according to instructions from the microcontroller to encode the message onto the laser signal reflected back to the first station.

7. The system of claim 1:

wherein the reflector of the second station comprises a mirror directionally actuated by a servo according to instructions from the processor and the memory of the second station; and wherein the instructions instruct the servo to encode the message onto the laser signal reflected back to the first station by directionally actuating the mirror to reflect only the portion of the transmitted laser signal back to the first station, the portion of the transmitted laser signal corresponding to a coding scheme to produce a coded signal within the laser light reflected back to the first station.

8. The system of claim 1:

wherein the first station is a ground station on Earth having the laser origination source therein.

9. A method for implementing laser communications between two stations, wherein the method comprises:

generating a laser signal at a first station via a laser origination source of the first station;

transmitting the laser signal from the first station to a second station;

receiving the laser signal transmitted from the first station at the second station;

modulating the received laser signal at the second station to encode a message onto the laser signal; and reflecting the modulated laser signal having the message encoded thereupon from the second station back to the first station, wherein the second station comprises a solar photovoltaic array for receiving sunlight and generating solar power at the second station; and wherein the method further comprises simultaneously generating the solar power at the second station and receiving the laser signal transmitted from the first station at the second station via the solar photovoltaic array.

10. The method of claim 9, wherein transmitting the laser signal from the first station to the second station comprises transmitting the laser signal line of sight from the first station to the second station.

11. The method of claim 9:

wherein generating the laser signal at a first station via the laser origination source of the first station comprises generating a violet laser signal via a laser diode at the first station; and wherein transmitting the laser signal from the first station to the second station comprises transmitting the violet laser signal from the first station to the second station via a transmitter of the first station.

12. The method of claim 9, further comprising:

focusing the generated laser signal at the first station via optics of the first station before transmitting the laser signal to the second station; and wherein transmitting the laser signal from the first station to a second station comprises transmitting the focused laser signal from the first station to the second station via a transmitter at the first station.

13. The method of claim 9:

wherein the first station is a ground station on Earth having the laser origination source therein.

14. The method of claim 13, wherein the second station is one of:

a spacecraft;

an Unmanned Aircraft System (UAS);

a drone;

a satellite;

a robot capable of movement;

a CubeSat having therein one or more commercial off-the-shelf (COTS) components proving electronics and structure;

a satellite in Low Earth Orbit;

a satellite in Medium Earth Orbit; and a satellite in geosynchronous orbit around Earth.

15. Non-transitory computer readable storage media having instructions stored thereupon that, when executed by a processor and a memory of a ground station, the instructions cause the ground station to perform operations including:
  generating a laser signal at the ground station via a laser origination source of the ground station;
  transmitting the laser signal from the ground station to a remote station, wherein the remote station comprises a spacecraft or satellite having solar photovoltaic panels thereupon;
  wherein the laser signal transmitted from the ground station is to be received by the remote station via the solar photovoltaic panels;
  wherein the remote station is to modulate the received laser signal transmitted from the ground station to encode a message onto the laser signal reflected back to the ground station and wherein the solar photovoltaic panels of the spacecraft or satellite operate to both generate power for the spacecraft or satellite; and
  receiving the modulated laser signal.

16. The non-transitory computer readable storage media of claim 15:
  wherein the modulated laser signal having the message encoded thereupon is a subset of the laser signal transmitted from the ground station to the remote station and reflected back to the ground station by the remote station.

* * * * *